US012232531B2

(12) United States Patent
Yu et al.

(10) Patent No.: US 12,232,531 B2
(45) Date of Patent: Feb. 25, 2025

(54) HEATING ELEMENT FOR ELECTRONIC VAPORIZATION DEVICES

(71) Applicant: FONTEM VENTURES B.V., Amsterdam (NL)

(72) Inventors: Fucheng Yu, Beijing (CN); Zhuoran Li, Beijing (CN)

(73) Assignee: FONTEM VENTURES B.V., Amsterdam (NL)

(*) Notice: Subject to any disclaimer, the term of this patent is extended or adjusted under 35 U.S.C. 154(b) by 302 days.

(21) Appl. No.: 17/852,973

(22) Filed: Jun. 29, 2022

(65) Prior Publication Data

US 2022/0330614 A1 Oct. 20, 2022

Related U.S. Application Data

(63) Continuation of application No. 16/799,519, filed on Feb. 24, 2020, now Pat. No. 11,395,514, which is a continuation of application No. 15/571,502, filed as application No. PCT/CN2015/078182 on May 4, 2015, now Pat. No. 10,588,350.

(51) Int. Cl.

| | |
|---|---|
| ***A24F 40/46*** | (2020.01) |
| ***A24F 40/44*** | (2020.01) |
| ***H05B 3/06*** | (2006.01) |
| ***H05B 3/14*** | (2006.01) |
| *A24F 40/10* | (2020.01) |

(52) U.S. Cl.

CPC .............. *A24F 40/46* (2020.01); *A24F 40/44* (2020.01); *H05B 3/06* (2013.01); *H05B 3/145* (2013.01); *A24F 40/10* (2020.01)

(58) Field of Classification Search

CPC .......... A24F 40/46; A24F 40/10; A24F 40/42; A24F 40/40; H05B 3/06

See application file for complete search history.

(56) References Cited

U.S. PATENT DOCUMENTS

| | | | | |
|---|---|---|---|---|
| 4,947,874 | A | 8/1990 | Brooks | |
| 10,398,176 | B2 * | 9/2019 | Hon | A24F 40/50 |
| 10,588,350 | B2 * | 3/2020 | Yu | A24F 40/44 |
| 10,932,493 | B2 * | 3/2021 | Hon | A61M 11/042 |
| 11,185,648 | B2 * | 11/2021 | Hon | A24F 40/50 |
| 11,395,514 | B2 * | 7/2022 | Yu | A24F 40/46 |
| 2014/0000638 | A1 | 1/2014 | Sebastian | |
| 2016/0309785 | A1 * | 10/2016 | Holtz | B65D 53/04 |
| 2016/0309786 | A1 * | 10/2016 | Holtz | H05B 3/16 |
| 2019/0104764 | A1 * | 4/2019 | Tucker | A24F 40/70 |
| 2022/0176046 | A1 * | 6/2022 | Hon | A61M 15/06 |

FOREIGN PATENT DOCUMENTS

| | | | |
|---|---|---|---|
| CN | 203523811 | U | 4/2014 |
| WO | 9816088 | A1 | 4/1998 |

* cited by examiner

*Primary Examiner* — Hae Moon Hyeon

(74) *Attorney, Agent, or Firm* — Perkins Coie LLP; Kenneth H. Ohriner

(57) ABSTRACT

An electronic cigarette includes an atomizer having a coil-less heating element having a heating section, two leads electrically connected to the heating section, and a liquid guiding structure. The liquid guiding structure includes two pads, a first pad and a second pad sandwiching at least a portion of the heating section. A gasket is positioned between a liquid supply and the first pad conducts liquid from the liquid supply to the first pad.

15 Claims, 20 Drawing Sheets

HEATING ELEMENT FOR ELECTRONIC VAPORIZATION DEVICES

CROSS-REFERENCE TO RELATED APPLICATION(S)

This application is a continuation of U.S. application Ser. No. 16/799,519, filed Feb. 24, 2020, which is a continuation of U.S. application Ser. No. 15/571,502, filed Nov. 2, 2017, now U.S. Pat. No. 10,588,350, which is the U.S. National Stage Entry of International Application No. PCT/CN2015/078182 filed May 5, 2015. These applications are incorporated herein by reference.

BACKGROUND OF THE INVENTION

An electronic smoking device, such as an electronic cigarette (e-cigarette), typically has a housing accommodating an electric power source (e.g. a single use or rechargeable battery, electrical plug, or other power source), and an electrically operable atomizer. The atomizer vaporizes or atomizes liquid supplied from a reservoir and provides vaporized or atomized liquid as an aerosol. Control electronics control the activation of the atomizer. In some electronic cigarettes, an airflow sensor is provided within the electronic smoking device which detects a user puffing on the device (e.g., by sensing an under-pressure or an air flow pattern through the device). The airflow sensor indicates or signals the puff to the control electronics to power up the device and generate vapor. In other e-cigarettes, a switch is used to power up the e-cigarette to generate a puff of vapor.

Atomizers in electronic smoking devices may have undesirable characteristics, such as poor atomization, large liquid drops in the final atomized vapor, nonuniform vapor caused by different sizes of liquid drops, too much moisture in the vapor, and/or poor mouthfeel, etc. Accordingly, there is a need for improved atomization in these devices.

Typically, the power supply is a disposable or rechargeable battery with working voltage decreasing over its useful life. The decreasing voltage may result in inconsistent puffs.

Moreover, the heating elements may have resistances that vary in operation due to factors, such as the amount of e-solution, the heating element contacts, and the operating temperature.

Therefore, there is a need to design a dynamic output power management unit to provide a stable output power in response to the changing capacity of the battery, and/or the changing/various resistance of the heating element.

SUMMARY OF THE INVENTION

In one aspect, an electronic cigarette includes a liquid supply, an air inlet, an inhalation port, and an atomizer within a housing. The atomizer includes a heating element which comprises a first lead, a second lead, a plurality of organic or inorganic conductive fibers electrically connected to the first and the second leads, and a first pad and a second pad sandwiching at least a portion of the fibers between the two leads. The electronic cigarette further includes an electric power source within the housing, such as a battery. The first lead and the second lead are electrically connected to the electric power source.

Either or both of the first pad and the second pad function as a liquid guiding structure by contacting a liquid in the liquid supply and conducting the liquid to the conductive fibers, such that the liquid vaporizes when heated.

Optionally a gasket is placed between the liquid supply and the first pad such that one surface of the gasket contacts the liquid supply and an opposite surface of the gasket contacts the first pad, thereby conducting the liquid to the first pad, and subsequently to the conductive fibers. The gasket can be made of wood fiber.

In another aspect, an electronic cigarette including a dynamic output power management unit for an electronic cigarette, provides a substantially constant amount of vaporized liquid in a predetermined time interval, for example, the duration of one puff. This can increase compatibility of an electronic cigarette to various types of heating elements, and/or may compensate for dropping output voltage of the power source.

With the present power management unit the discharging time of the power source is adjusted dynamically to obtain more consistent vaporization over the same time interval. Consequently, a more consistent amount of aerosol may be inhaled by a user during each puff.

To compensate for a dropping output voltage of the power source drops over the discharging time, waveform control technique, for example, PWM (pulse width modulation) technique maybe used to control a at least one switching element within the heating circuit, to control the active time of the heating circuit. A waveform generator can be used to generate the desired control waveform. The waveform generator can be a PWM waveform generator within a PWM controller or PWM module in a microcontroller, for example, a Metal Oxide Semiconductor Field Effect Transistor (MOSFET). A hightime and lowtime ratio is determined, which is then used by the PWM controller for controlling the ON/OFF switching of the heating circuit.

In designs where the resistance of the heating element changes as the working temperature changes, the instantaneous resistance of the heating element may be measured in real-time by incorporating a reference component, for example a reference resister, into the heating circuit to control the active time of the heating circuit.

Changing resistance of the heating element may change the amount of aerosol generated during the process of vaporization, resulting in variations in the amount or character of the vapor generated. The nicotine for example, needs to be controlled within a particular range so that a human being's throat will not be irritated or certain administrative regulatory requirements could be meet. Therefore, another benefit of the dynamic output power management technique is that it can be compatible to various types of heating elements, for example, coil-less heating element, such as fiber based heating element, among others. Especially for heating element made from fibers, carbon fiber bundles for example, of which a precise resistance cannot be feasibly maintained for all the carbon fiber bundles in a same batch, the dynamic output management technique is desirable since it can adjust the output power within a range responsive to carbon fiber bundles with resistance within a range of, for example 1.5 ohms. This would alleviate the burden of the manufacturing process of the carbon fiber bundle and lower the cost of the carbon fiber bundles as a result. The characteristics, features and advantages of this invention and the manner in which they are obtained as described above, will become more apparent and be more clearly understood in connection with the following description of exemplary embodiments, which are explained with reference to the accompanying drawings.

BRIEF DESCRIPTION OF THE DRAWINGS

In the drawings, the same element number indicates the same element in each of the views.

FIG. 3(*a*) is an enlarged side view of a coil-less heating element without a gasket in contact with a liquid supply. FIG. 3(*b*) is an enlarged side view of a coil-less atomizer with a gasket in contact with a liquid supply. FIG. 3(*c*) is a top cross-section view of a coil-less heating element of FIG. 3(*a*) or FIG. 3(*b*) in contact with a liquid supply. The gasket is between the liquid supply and the first pad of the liquid guiding structure and therefore not shown from the top view;

DETAILED DESCRIPTION

Figure 1:
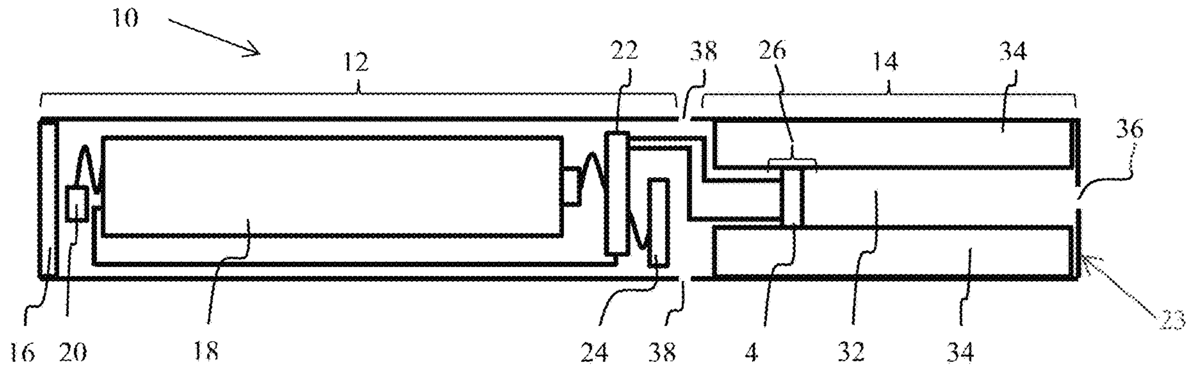
FIG. 1 is a schematic cross-sectional illustration of an exemplary e-cigarette.

As is shown in FIG. 1, an e-cigarette (electronic cigarette) 10 typically has a housing comprising a cylindrical hollow tube having an end cap 16. The cylindrical hollow tube may be single piece or a multiple piece tube. In FIG. 1, the cylindrical hollow tube is shown as a two piece structure having a battery portion 12 and an atomizer/liquid reservoir portion 14. Together the battery portion 12 and the atomizer/liquid reservoir portion 14 form a cylindrical tube which is approximately the same size and shape as a conventional cigarette, typically about 100 mm with a 7.5 mm diameter, although lengths may range from 70 to 150 or 180 mm, and diameters from 5 to 20 mm.

Battery portion 12 and atomizer/liquid reservoir portion 14 are typically made of steel or hardwearing plastic and act together with end cap 16 to provide a housing to contain the components of e-cigarette 10. Battery portion 12 and atomizer/liquid reservoir portion 14 may be configured to fit together by a friction push fit, a snap fit, or a bayonet attachment, magnetic fit, or screw threads. End cap 16 is provided at a first end of the housing. End cap 16 may be made from translucent plastic or other translucent material to allow a light emitting diode (LED) 20 positioned near the end cap to emit light through the end cap. The end cap can be made of metal or other materials that do not allow light to pass.

An air inhalation port 36 is provided at an end of atomizer/liquid reservoir portion 14 remote from end cap 16. Inhalation port 36 may be formed from the atomizer/liquid reservoir portion 14 of the cylindrical hollow tube or may be formed in end cap 16.

An air inlet may be provided in end cap 16, at the edge of the air inhalation port next to the cylindrical hollow tube, anywhere along the length of the cylindrical hollow tube, or at the connection of battery portion 12 and atomizer/liquid reservoir portion 14. FIG. 1 shows a pair of air inlets 38 provided at the intersection between battery portion 12 and atomizer/liquid reservoir portion 14.

A battery 18, LED 20, control electronics 22 and optionally an airflow sensor 24 are provided within the cylindrical hollow tube in battery portion 12. Battery 18 is electrically connected to control electronics 22, which is electrically connected to LED 20 and airflow sensor 24. In this example LED 20 is at an end of battery 18 adjacent to end cap 16, and control electronics 22 and airflow sensor 24 are provided at the other end of battery 18 adjacent atomizer/liquid reservoir portion 14.

Airflow sensor 24 acts as a puff detector, detecting a user puffing or sucking on a mouthpiece of atomizer/liquid reservoir portion 14 of e-cigarette 10. Airflow sensor 24 can be any suitable sensor for detecting changes in airflow or air pressure such as a microphone switch including a deformable membrane which is caused to move by variations in air pressure. Alternatively the sensor may be a Hall element or an electro-mechanical sensor.

Control electronics 22 are also connected to an atomizer 26. In the example shown, atomizer 26 includes a coil-less heating element 4 extending across a central passage 32 of atomizer/liquid reservoir portion 14. Coil-less heating element 4 does not completely block central passage 32. Rather an air gap is provided on either side of coil-less heating element 4 enabling air to flow past the heating element. The atomizer may alternatively use other forms of heating elements, such as ceramic heaters, or fiber or mesh material heaters. Nonresistance heating elements such as sonic, piezo and jet spray may also be used in the atomizer.

Central passage 32 is surrounded by a cylindrical liquid supply 34 with a liquid guiding structure abutting or extending into liquid supply 34. Liquid supply 34 may alternatively include wadding soaked in liquid which encircles central passage 32 with the ends of the liquid guiding structure abutting the wadding. In other embodiments liquid supply 34 may comprise a toroidal cavity arranged to be filled with liquid and with the ends of the liquid guiding structure extending into the toroidal cavity.

In use, a user sucks on the mouthpiece 23 of e-cigarette 10. This causes air to be drawn into e-cigarette 10 via one or more air inlets, such as air inlets 38 and to be drawn through central passage 32 towards air inhalation port 36. The change in air pressure which arises is detected by airflow sensor 24 which generates an electrical signal that is passed to control electronics 22. In response to the signal, control electronics 22 activates coil-less heating element 4 which causes liquid present in coil-less heating element 4 to be vaporized creating an aerosol (which may comprise gaseous and liquid components) within central passage 32. As the user continues to suck on e-cigarette 10, this aerosol is drawn through central passage 32 and inhaled by the user. At the same time control electronics 22 also activates LED 20 causing LED 20 to light up which is visible via the translucent end cap 16 mimicking the appearance of a glowing ember at the end of a conventional cigarette. As liquid present in coil-less heating element 4 is converted into an aerosol more liquid is drawn into coil-less heating element 4 from liquid supply 34 by capillary action and thus is available to be converted into an aerosol through subsequent activation of coil-less heating element 4.

Some e-cigarettes are intended to be disposable and the electric power in battery 18 is intended to be sufficient to vaporize the liquid contained within liquid supply 34 after which e-cigarette 10 is thrown away. In other embodiments battery 18 is rechargeable and liquid supply 34 is refillable. In the cases where liquid supply 34 is a toroidal cavity, this may be achieved by refilling the liquid supply via a refill port. In other embodiments atomizer/liquid reservoir portion 14 of e-cigarette 10 is detachable from battery portion 12 and a new atomizer/liquid reservoir portion 14 can be fitted with a new liquid supply 34 thereby replenishing the supply of liquid. In some cases, replacing liquid supply 34 may involve replacement of coil-less heating element 4 along with the replacement of liquid supply 34.

The new liquid supply 34 may be in the form of a cartridge having a central passage 32 through which a user inhales aerosol. In other embodiments, aerosol may flow around the exterior of the cartridge to air inhalation port 36.

Of course, in addition to the above description of the structure and function of a typical e-cigarette 10, variations also exist. For example, LED 20 may be omitted. Airflow sensor 24 may be placed adjacent end cap 16 rather than in the middle of the e-cigarette. Airflow sensor 24 may be replaced with a switch which enables a user to activate the e-cigarette manually rather than in response to the detection of a change in air flow or air pressure.

Different types of atomizers may be used. For example, a coil-less atomizer for an electronic cigarette has a heating element made of electrically conductive fiber materials. In one aspect, the conductive fibers are sandwiched between a first pad and a second pad, which pads function as a liquid guiding structure. One or both pads contact a liquid supply. The pads conduct liquid from a liquid container or liquid supply to the heating element. The pads may be made of natural or synthetic fibers, or of other materials that conduct liquid via capillary action or diffusion, such as glass fiber.

In a related aspect, the heating element may further include a gasket made of wood fibers placed between the liquid supply and the pads, with one surface of the gasket touching the liquid supply and an opposite surface of the gasket touching the first pad. The gasket conducts liquid from the liquid supply to the first pad. In addition to wood fibers, other cellulose fibers such as plant fibers can be used for the gasket.

More specifically, an electronic cigarette includes a coil-less atomizer having a heating element with a first lead, a second lead, and one or more conductive fibers electrically connected to the first and second leads. The section between the leads forms a heating section. At least a portion of the conductive fibers in the heating section are sandwiched with two pads, a first pad and a second pad. The pads are made of glass fiber, carbon fiber, or any other fibers suitable for conducting liquid. The pads contact the liquid in a liquid supply, thereby directing liquid to the heating section of the conductive fibers. The heating element further includes an optional gasket. When a gasket is used, the gasket is placed between the liquid supply and the first pad such that one surface of the gasket touches the liquid supply and the opposite surface of the gasket touches the first pad, thereby conducting the liquid from the liquid supply onto the first pad.

A section of the conductive fibers may be coated with a conductive material to reduce the electrical resistance of the fibers. Alternatively, the conductive fiber material may be shaped to have areas of lesser and greater resistance. The conductive fibers may further comprise a first and a second conductive sections. The first and the second conductive sections are proximal to the first and second leads, respectively. The first and second conductive sections may have low electrical resistances (e.g., about 1Ω or less) relative to the electrical resistance of the heating section which has a higher electrical resistance (e.g., about 3Ω to about 5Ω, or about 1Ω to about 7Ω). The heating element may be designed to have a desired total electrical resistance of about 3Ω to about 6Ω, or about 1Ω to about 8Ω. When the e-cigarette is switched on, electricity flows between the electrodes through the conductive sections and the heating section. Electric current flowing through the heating element generates heat at the heating section, due to the higher resistance of the heating section.

Figure 2:
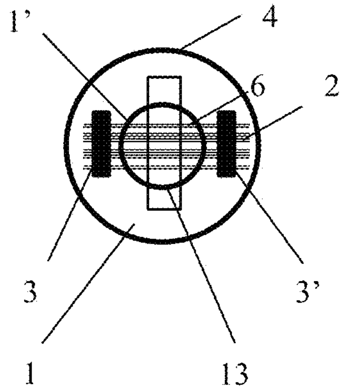
FIG. 2 is a top view of a coil-less heating element having a liquid guiding structure.

As shown in FIG. 2, a coil-less heating element 4 includes conductive fibers 2 of the heating element mounted on a board 1 between two leads 3 and 3'. The board may be a printed circuit board (PCB) with other electrical components, or it may be a board where the only electrical component is coil-less heating element 4. The board may be an insulating material that provides sufficient support for the heating element, for example fiberglass. The fibers between leads 3 and 3' form a heating section 6. The heating section is oriented perpendicular to the air flow in central passage 32. At least a portion of the fibers in the heating section are sandwiched between a first pad 13 and a second pad 13' (not shown from the top view). First pad 13 and second pad 13' are made of any conductive material such as glass fiber or carbon fiber and function as a liquid guiding structure to conduct liquid from a liquid supply to conductive fibers 2. First pad 13 and second pad 13' may have the same or different size and/or shape. Board 1 may have a through hole 1' at least partially overlapping with part of heating section 6 (e.g. overlapping with about 30% to about 100%, about 50% to about 100%, about 90% to about 100%, or about 100% of the heating section). Leads 3 and 3' may be made of any conductive materials. The leads may optionally also be made of conductive material that can transport liquid to conductive fibers 2. Conductive fibers 2 may or may not extend laterally beyond leads 3 and 3'. Conductive fibers 2 may be positioned substantially parallel to each other between leads 3 and 3', wherein the largest angle between a fiber and a line connecting leads 3 and 3' is about 0 to about 10°, about 0 to about 5°, or about 0 to about 2°.

The conductive material used to make leads 3 and 3', which can transport liquid, may be porous electrode materials, including but not limited to, conductive ceramics (e.g. conductive porous ceramics and conductive foamed ceramics), foamed metals (e.g. Au, Pt, Ag, Pd, Ni, Ti, Pb, Ba, W, Re, Os, Cu, Ir, Pt, Mo, Mu, W, Zn, Nb, Ta, Ru, Zr, Pd, Fe, Co, V, Rh, Cr, Li, Na, Tl, Sr, Mn, and any alloys thereof), porous conductive carbon materials (e.g. graphite, graphene and/or nanoporous carbon-based materials), stainless steel fiber felt, and any composites thereof. Conductive ceramics may comprise one or more components selected from the group consisting of oxides (e.g. ZrO2, TrO2, SiO2, Al3O2, etc.), carbides (e.g. SiC, B4C), nitrides (e.g. AlN), any of the metals listed above, carbon (e.g. graphite, graphene, and carbon-based materials), Si, and any combinations and/or composites of these materials. The term "composite" of two or more components means a material obtained from at least one processing of the two or more components, e.g. by sintering and/or depositing.

For clarity of illustration, FIG. 2 schematically shows only a few spaced apart fibers. However, the individual fibers shown may also be fibers in contact. The individual fibers may also be provided in the form of a fabric, where the fibers are in contact with each other to provide transport of liquid by capillary action. The diameters of the fibers may be about 40 μm to about 180 μm, or about 10 μm to about 200 μm. The fibers may have substantially similar or different diameters. The fibers may allow liquid to flow along or though the fibers by capillary action. The fiber materials may be organic fibers and/or inorganic fibers. Examples of inorganic fibers include carbon fibers, SiO2 fibers, TiO2 fibers, ZrO2 fibers, $Al_2O_3$ fibers, Li4Ti5O12 fibers, LiN fibers, Fe—Cr—Al fibers, NiCr fibers, ceramic fibers, conductive ceramic fibers, and modified fibers thereof. Examples of organic fibers include polymer fibers (e.g. polyaniline fibers, and aramid fibers), organometallic fibers and modifications of these types of fibers.

Fibers may be modified to improved surface properties (e.g. better hydrophilic properties to enhance wicking abilities) by exposure/coating/adhering the fibers to compounds having hydrophilic groups (e.g. hydroxide groups).

Fiber materials may also be modified to have desired electrical properties. For example the electrical conductivity of the fiber material may be changed by applying one or more modifying materials onto fiber material. The modifying materials may include SnCl2, carbon (e.g. graphite, graphene and/or nanoporous carbon-based materials), any of the metals listed above, and/or alloys of them, to increase the electrical conductivity of the fibers, or the fiber material. Certain salts may be used as the modifying material to provide for lower conductivities. The modifying material may be applied to the fibers or fiber material by coating, adhering, sputtering, plating, or otherwise depositing the modifying material onto the fibers or fiber material.

In e-cigarette operation using the heating element shown in FIG. 2, liquid from a liquid supply is provided onto the heating section through the leads. Additionally, liquid from a liquid supply is conducted onto the heating section through a liquid guiding structure, such as pads 13 and 13'. As the user inhales on the e-cigarette, vaporized liquid mixes with air flowing through the through hole 1' which at least partially overlaps with part of heating section 6 (e.g. overlapping with about 30% to about 100%, about 50% to about 100%, about 90% to about 100%, or about 100% of the heating section).

Figure 3A:
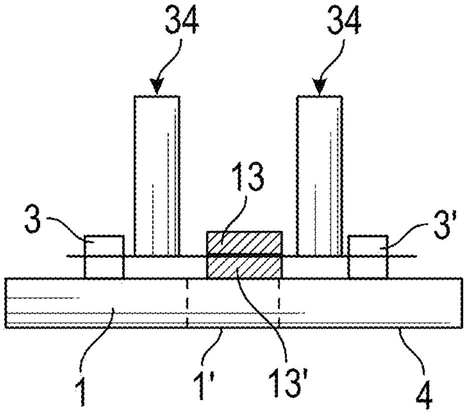
FIG. 3(*a*)-3(*c*) illustrate a coil-less heating element having a liquid guiding structure in contact with a liquid supply.
Figure 3B:
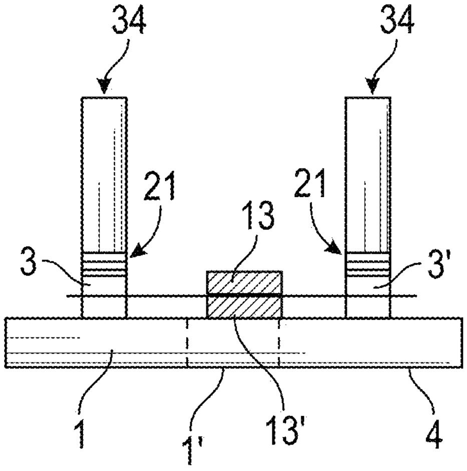
Figure 3C:
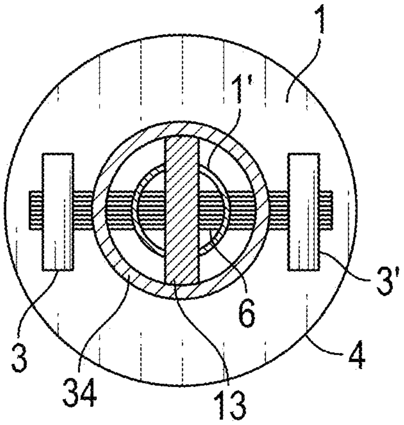

FIGS. 3(*a*)-3(*c*) illustrate the configurations of a coil-less heating element having a liquid guiding structure, with or without the optional gasket. FIG. 3(*a*) shows a side view of a coil-less atomizer. Coil-less heating element 4 has heating section 6 between leads 3 and 3'. At least a portion of heating section 6 is sandwiched between a first pad 13 and a second pad 13'. A liquid supply 34 contacts first pad 13, which conducts liquid through pores in the conductive material of the pad, or via capillary action, onto heating section 6. FIG. 3(*b*) shows a side view of another coil-less atomizer having a gasket. The configuration illustrated in FIG. 3(*b*) is similar to that of FIG. 3(*a*) except that a gasket 21 is placed between liquid supply 34 and first pad 13 such that one surface of gasket 21 touches liquid supply 34 and an opposite surface of gasket 21 touches first pad 13. FIG. 3(*c*) is a top cross-sectional view of a coil-less heating element showing that liquid supply 34 touches first pad 13 if a gasket is not used. When a gasket is used, it is placed between the liquid supply and the first pad and therefore, invisible from the top cross-sectional view.

Figure 4:
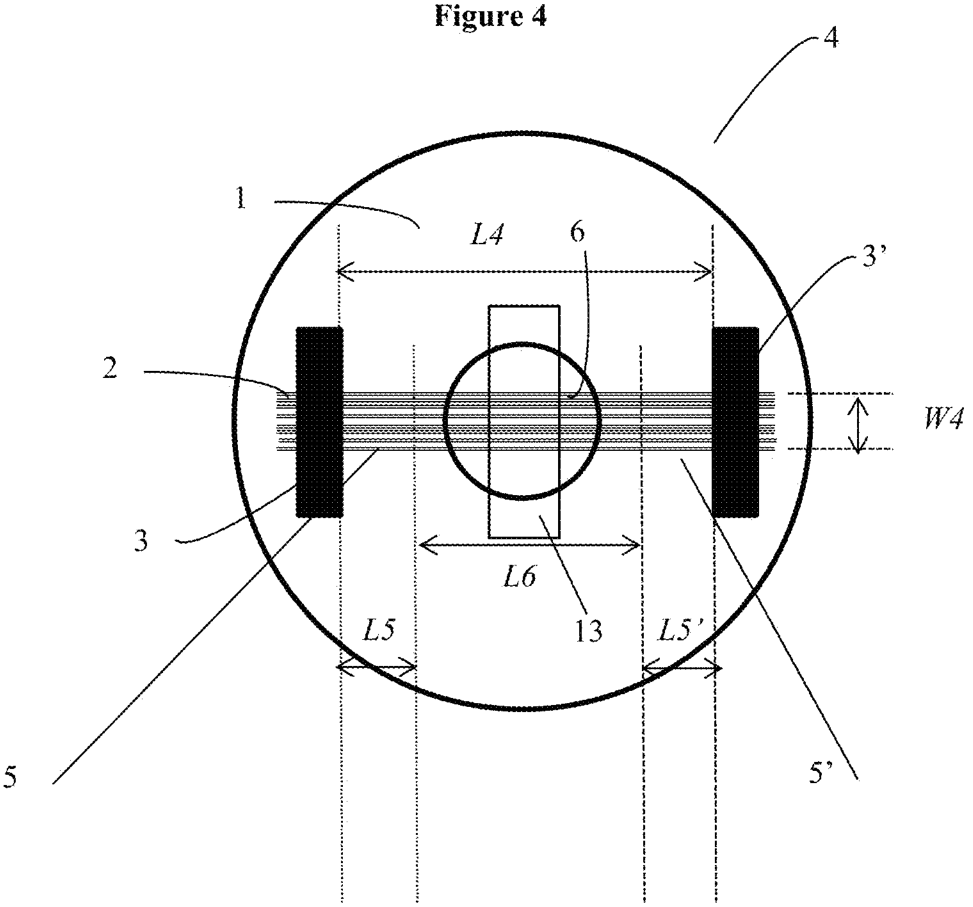
FIG. 4 is a top view of a coil-less heating element having coated conductive fibers.

FIG. 4 illustrates that the coil-less heating element 4 shown in FIG. 2 is further modified to have different conductive sections. Conductive fibers 2 are mounted on board 1 between two leads 3 and 3'. At least a portion of heating section 6 is sandwiched between pads 13 and 13'. Leads 3 and 3' may or may not be made of a conductive material capable of allowing liquid to reach conductive fibers 2, as described above relative to FIG. 2. The fibers may, or may not, extend laterally beyond the leads. The fibers between leads 3 and 3' have a first conductive section 5 electrically connected to a first lead 3, a second conductive section 5' electrically connected to a second lead 3', and a heating section 6 between first conductive section 5 and second conductive section 5'. Conductive sections 5 and 5' have lower electrical resistance relative to heating section 6. Heating section 6 and leads 3 and 3' may have electrical resistances selected so that the total electrical resistance of coil-less heating element 4 is suitable for the operation of an electric cigarette typically operating with DC battery voltage of from about 3 to 5 volts. In this case coil-less heating element 4 may have a resistance of about 3~5Ω, or about 3.8Ω at room temperature.

Electrical resistance of a conductor can be calculated by the following formula:

$$R = \rho \frac{\ell}{A},$$

where R is electrical resistance (Ω), l is the length of the conductor, A is the cross-sectional area of the conductor ($m^2$), and ρ is the electrical resistivity of the material (Ω m).

The areas of the fibers in relation to the current may not be significantly different between conductive sections 5 and 5' and heating section 6. However, the electrical resistance of the conductive sections should be lower than the heating section. This may be achieved by selectively modifying the fibers, as described above, to reduce to resistance of the conductive sections, and/or to increase the resistance of the heating section.

In FIG. 4, conductive sections 5 and 5' have lengths of L5 and L5'. Heating section 6 has length L6. The distance between leads 3 and 3' is L4. Dimensions L4, L5, L5', and L6 can be adjusted along with the selection of the one or more fibers, to achieve a specified electrical resistance. For example, for a heating element with an electrical resistance of about 3~5Ω, or about 3.8Ω, and L6 may be about 3 to about 4 mm. L4, L5, L5', and L6 can also be selected according to the size of the electronic cigarette in which the atomizer is to be used. For example, coil-less heating element 4 may be used in an electronic cigarette having a diameter of about 5 mm to about 10 mm.

Figure 5:
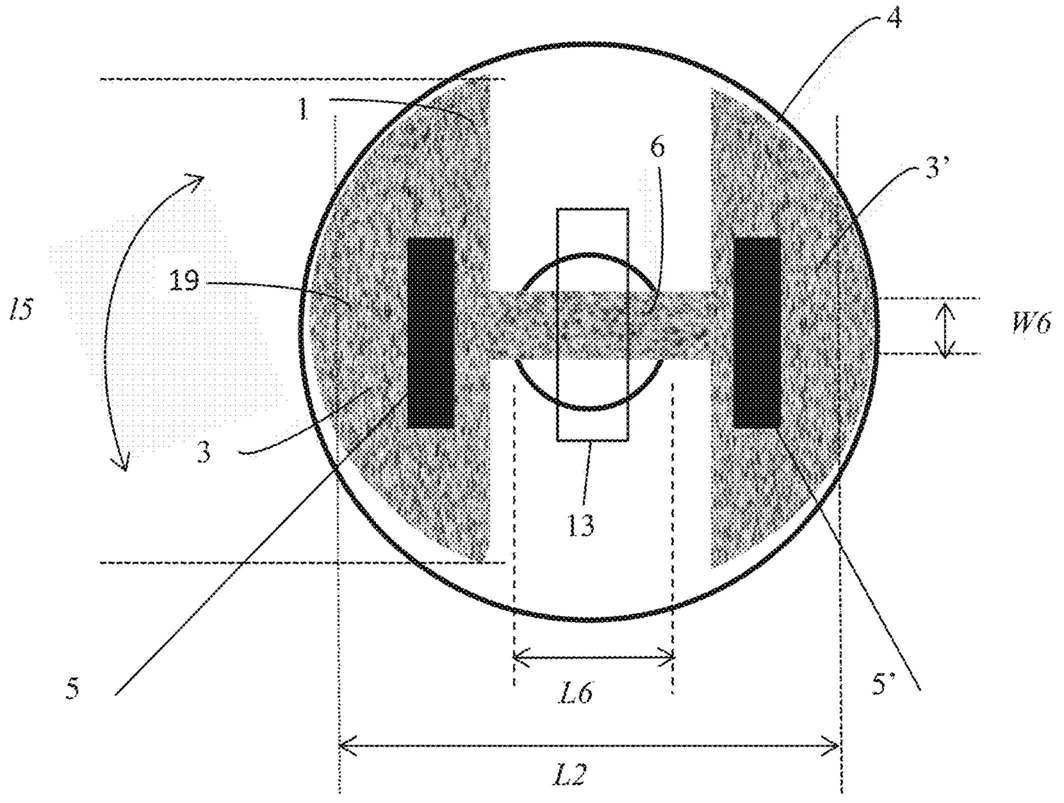
FIG. 5 is a top view of a coil-less heating element shaped to have different areas of electrical resistance.
Figure 6A:
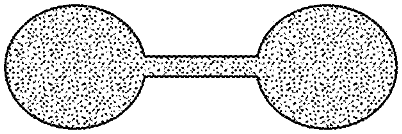
FIGS. 6(*a*)-6(*d*) illustrate different shapes of the fiber material pad.
Figure 6B:
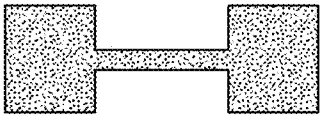
Figure 6C:
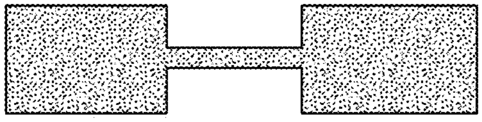
Figure 6D:
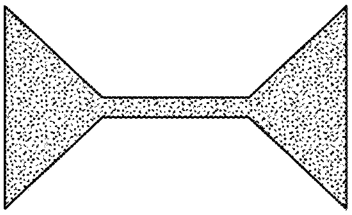
Figure 7A:
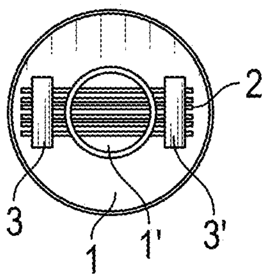
FIGS. 7(*a*)-7(*e*) illustrate a method of coating conductive fibers to make the coil-less heating element shown in FIG. 2.
Figure 7B:
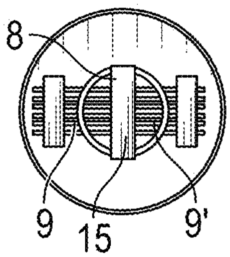
Figure 7C:
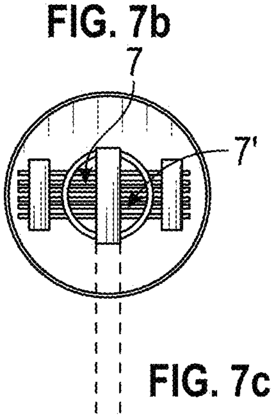
Figure 7D:
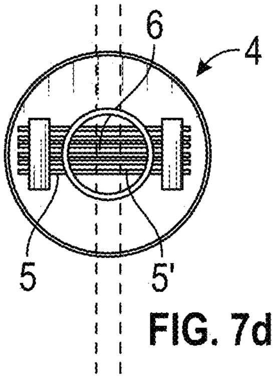
Figure 7E:
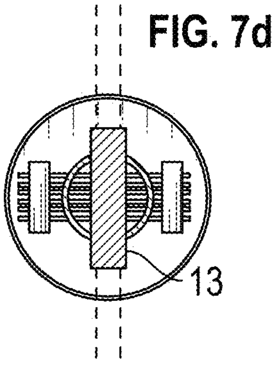
Figure 8A:
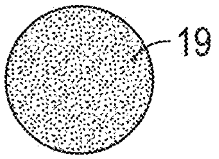
FIGS. 8(*a*)-8(*g*) illustrate a preparation process of the coil-less heating element shown in FIG. 5.
Figure 8B:
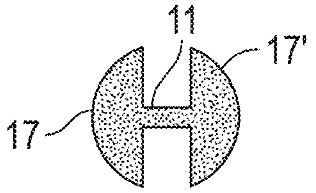
Figure 8C:
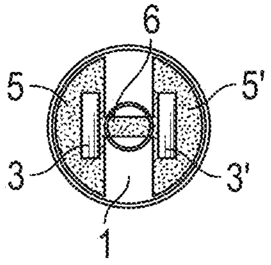
Figure 8D:
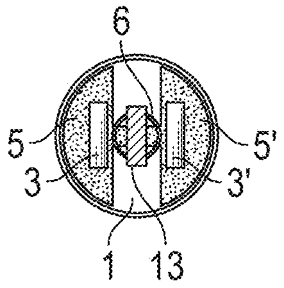
Figure 8E:
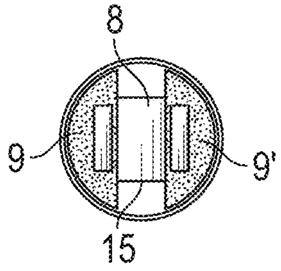
Figure 8F:
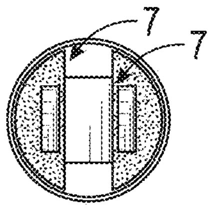
Figure 8G:
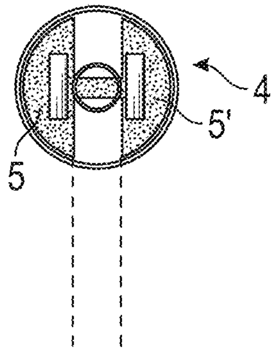

In another embodiment, the different electrical resistances between the conductive and heating sections of the coil-less heating element are achieved by shaping the sections to have different cross-section with the current, as shown in FIG. 5.

FIG. 5 shows coil-less heating element 4 having a pad 19 of one or more fiber materials electrically connected with two leads 3 and 3' on board 1. The fiber material pad 19 has a first conductive section 5, a second conductive section 5', and a heating section 6. At least a portion of heating section 6 is sandwiched between a first pad 13 and a second pad 13' (not shown). The surfaces of board 1 that contact fiber material pad 19 may be conductive and electrically connected to leads 3 and 3'. Alternatively, at least a significant portion (e.g. about 70% to about 99.9%, about 80% to about 99.9%, or about 90% to about 99.9%) of the surface of board 1 that contacts conductive sections 5 and 5' of fiber material pad 19 may be conductive and electrically connected to leads 3 and 3'. Therefore, the areas of conductive sections 5 and 5' may be considered as the cross-section areas of the conductive sections, and the area of heating section 6 may be considered as the cross-section area of the heating section.

The areas of first and second conductive sections 5 and 5' are significantly larger than the area of heating section 6 (e.g. 3, 4, 5 or 10 to 20 times larger), so that heating section 6 has higher electrical resistance than conductive sections 5 and 5'. Although the thickness of fiber material pad 19 may vary through the same pad, the depth differences have insignificant impact on the conductivities when compared to the area differences between conductive sections 5 and 5' and heating section 6.

Fiber material pad 19 may adopt any shape having two wider parts linked by a narrow part. For example, the fiber material pad 19 may have a shape of a bow-tie or a dumb-bell (e.g., see. FIG. 6(*a*)). The wider end sections of the bow-tie or dumb-bell form the conductive sections. The narrow middle section of the bow-tie or dumb-bell forms heating section 6. In another example, the wider parts may be square (e.g., see. FIG. 6(*b*)), rectangle (e.g., see. FIG. 6(*c*)), triangle (e.g., see. FIG. 6(*d*)), or round or oval shape (e.g., see. FIG. 6(*a*)). In certain embodiments, fiber material pad 19 may be a circular pad having a diameter of about 8 mm, and a thickness of about 1 mm. The length (L6) of heating section 6 may be about 3 to about 4 mm. The width (W6) of heating section 6 may be about 1 mm. The arc length of the conductive section (I5) may be about 10 mm. The areas of conductive sections 5 and 5' may be about 12 to about 20 $mm^2$, respectively. The area of heating section 6 may be about 3 to about 4 $mm^2$. The ratio between the area of conductive section 5 and the area of heating section 6 is about 3, 4, 5 or 10 to 20.

The diameters of the fibers in the fiber material pad may be about 40 μm to about 180 μm, or about 10 μm to about 200 μm, and the thickness of the fiber material pad may be 0.5 to 2 mm or about 1 mm. The fiber materials and modifications described above may also be used on the fiber material pad of this embodiment.

FIGS. 7(*a*)-7(*e*) show a manufacturing process of the coil-less heating element shown in FIG. 2, which may include the following steps:

a) Installing one or more conductive fibers 2 on a board 1 between a first lead 3 and a second lead 3' (FIG. 7(*a*)). Board 1 has a through hole 1' between the first and second leads 3 and 3'.

b) Covering a portion of the fibers between first lead 3 and second lead 3' with a mask 8 to provide a masked portion 15 of the fibers 2 and unmasked portions 9 and 9' of the fibers 2 (FIG. 7(*b*)). Through hole 1' at least partially overlaps with part of masked portion 15.

c) Applying a modifying agent 7 having a lower electrical resistance than the fibers to at least a portion of the unmasked portions of the fibers before sputtering (FIG. 7(*c*)).

d) Removing mask 8 to expose the fibers underneath (FIG. 7(*d*)).

e) Applying a first pad 13 and a second pad 13' such that part or all of masked portion 15 is sandwiched between pads 13 and 13' to provide a heating element as illustrated in FIG. 2.

FIGS. 8(*a*)-8(*d*) show a manufacturing process of the coil-less heating element shown in FIG. 5, which may include the following steps:

I) Shaping a fiber material pad 19 of one or more fiber materials (FIG. 8 (*a*)) to a shape having a first fiber material section 17, a second fiber material section 17', and a third fiber material section 11 (FIG. 8 (*b*)) between the first and second sections 17 and 17' (FIG. 8 (*b*)), wherein the first and second sections 17 and 17' have areas respectively larger than that of the third fiber material section 11 (FIG. 8 (*b*)).

II) Installing the shaped fiber material pad 19 obtained from step I) on a board 1 between a first lead 3 and a second lead 3' (FIG. 8 (*c*)). The third fiber material section 11 (FIG. 8 (*b*)) becomes heating section 6 (FIG. 8 (*c*)); the first and second wider fiber material sections 17 and 17' (FIG. 8 (*b*)) become first and second conductive sections 5 and 5' (FIG. 8 (*c*)), respectively.

III) Applying a first pad 13 and a second pad 13' such that a portion of fibers or the entire section of fibers in heating section 6 is sandwiched between pads 13 and 13' (FIG. 8(*d*)) to provide a heating element as illustrated in FIG. 5.

FIGS. 8(*e*)-8(*g*) show optional processes that can be further carried out after Step (II) and before Step (III), using the following steps:

1) Covering a portion or all of heating section 6 with a mask 8 to provide a masked portion 15 of fibers 2 and unmasked portions 9 and 9' of fibers 2 (FIG. 8(*e*)).

2) Applying at least part of unmasked portions 9 and 9' with a modifying agent 7 as described above, while leaving the masked portion 15 of the fibers untreated, with the modifying agent 7 having a lower electrical resistance than the fibers before sputtering (FIG. 8(*f*)).

3) removing mask 8 to expose the fibers underneath (FIG. 8(*g*)).

The processes as discussed above may be adjusted to provide a heating element with an initial electrical resistance of about lower than desired. The heating element may then be further processed via sintering with the following steps to provide a final electrical resistance of ±0.1Ω of the desired electrical resistance (FIG. 9) via the following steps:

i) Applying a known voltage (V) to first lead 3 and second lead 3', optionally conductive fibers 2 of coil-less heating element 4 are coated or otherwise treated with a sintering material. As the heating element heats up, the resistance of conductive fibers 2 and/or the sintering material permanently changes.

ii) Monitoring the current (I) through coil-less heating element 4.

iii) Switching the voltage off when the measured current (I) reaches to a current corresponding to the desired electrical resistance of coil-less heating element 4.

The sintering process may be applied in ambient air. Alternatively, the sintering process may be accelerated by adding oxygen to the process.

The heating elements described can be efficiently and conveniently produced in mass production, at low cost. They can also be manufactured with precise control of electrical resistance, leading to better performance when used in an electronic cigarette. The heating elements described may also be made in small sizes providing greater versatility for use in electronic cigarettes. The liquid guiding structure, used alone or in combination with a gasket, provides improved liquid conduction onto the heating section.

The coil-less atomizer described above may alternatively be described as an electrically conductive liquid wick having leads and a heating section which is sandwiched between two pads. The heating section may be defined by an area of the wick having higher electrical resistance than the leads, so that electrical current passing through the wick heats the heating section to a high temperature, such as 100° C. to 350° C., while the leads, which are in contact with a bulk liquid source, remain relatively unheated. The wick, as a single element, heats liquid to generate vapor, and also conveys liquid from the bulk liquid source to the heating location. Additionally, the pads sandwiching the heating section conduct liquid to the heating section. The pads are made of suitable porous fibers such as glass fibers that conduct liquid but not electricity. Optionally, a gasket made of wood fiber can be placed between the bulk liquid source and the first pad such that one surface of the gasket touches the bulk liquid source and the opposite surface of the gasket touches the first pad. The electrically conductive liquid wick may be made of fibers, fabric, felt or porous matrix that can conduct both electrical current and liquid through the wick material, and with the electrical resistance of the wick non-uniform to provide a distinct heating section. The heating section and the leads may be integrally formed of the same underlying material, before treating the material to create different electrical resistances between the leads and the heating section. Generally the wick has a single heating section sandwiched between two pads and bordered by two leads.

The wick may be flat, for example like fabric. The wick may be largely impermeable to air flow. The heating section of the wick may be oriented perpendicular to air flow within an electronic cigarette, with air flowing around the wick, rather than through the wick. Within the atomizing chamber or space, the wick may be perpendicular to the air flow and not loop back on itself, and also not extend longitudinally or parallel to the direction of air flow. In an electronic cigarette having dimensions comparable to a conventional tobacco cigarette (5-10 or 12 mm in diameter and 80-120 mm long), the bulk liquid source contains enough liquid for at least 100 puffs and up to 500 puffs (typically 0.1 to 2 mL).

In some embodiments, the wick can be made by braiding or bonding more than one fiber materials into a braid or into a bunch. For example, the braid or bunch or fibers can be formed by braiding or bonding a conductive fiber such as carbon fiber, and a non-conductive fiber such as glass fiber. Compare to wicks made only by glass fibers, the braid made by both glass fibers and carbon fibers can both wicking liquid from the liquid structure and acting as a heating element. Compared to wicks made only by carbon fibers, a relatively higher wicking effect can be achieved without sacrificing resistance of the braid.

Textile of the braid can vary along the length of the braid to reflect difference on wicking effect and resistance along the length of the braid. For example, a middle segment of the braid can be braided to have a larger resistance whereas two end segments abutting the leads can be braided with lower resistance so that the middle segment acts as the heating element.

By using a braid made by carbon fibers and glass fibers, the liquid guiding pads can be eliminated since liquid required for vaporization can be introduced directly to the braid, especially the middle segment of the braid from the end segments.

In other embodiments, for example the embodiments illustrated around FIG. 5, conductive sections 5, 5' can be eliminated by using a fiber material pad 19 made from more than one fiber material, for example from carbon fibers and glass fibers. The fiber material pad 19 can be made from two fiber materials that are woven into a fiber fabric with unitary fiber textile along the whole pad, that is, along sections 5, 5' and 6. Alternatively, different fiber textiles can be made for different sections of the fiber material pad. For example, first and second conductive sections 5 and 5' can be made in a textile that has lower resistance but higher wicking effect, whereas section 6 can be made in a textile that has higher resistance but the same or lower wicking effect.

Prophetic Example 1. A Coil-Less Atomizer as Shown in FIG. 4, Prepared According to the Process Illustrated in FIGS. 7 and 9

I) Installation and Sputtering (FIG. 7)

In this example, a plurality of conductive fibers 2 made of $SiO_2$ are installed on a circular printed circuit board (PCB) 1 between two metal leads 3 and 3'. The board has a through hole 1' between leads 3 and 3'. A mask 8 is placed to cover a portion (about 3 to about 4 mm lateral) of the fibers between leads 3 and 3' to provide a masked portion 15 of the fibers 2 and unmasked portions 9 and 9' of the fibers 2. The through hole 1' overlaps with masked portion 15. The unmasked portions 9 and 9' are sputtered with Cr. Mask 8 is removed to expose the fibers underneath. A first pad 13 and a second pad 13' are applied such that part or all of masked portion 15 is sandwiched between pads 13 and 13' to provide a coil-less heating element 4 as illustrated in FIG. 2.

Figure 9:
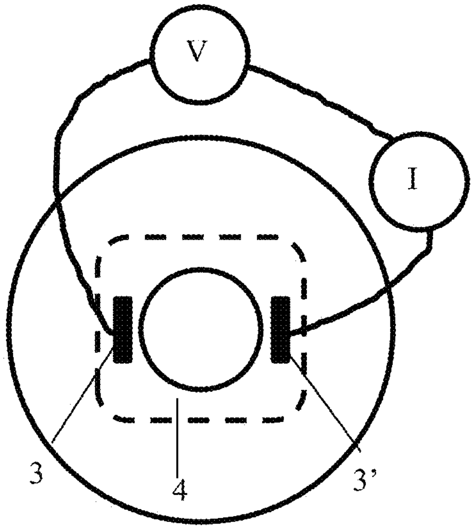
FIG. 9 illustrates a process of modifying the electrical resistance of a coil-less heating element to a desired range.

II) Sintering (FIG. 9)

The electrical resistance of coil-less heating element 4 is about 2.8 to about 3.2Ω. A voltage of 3.8 V is applied to leads 3 and 3', and the current (I) through the coil-less heating element 4 is monitored. The voltage is switched off when the measured current (I) reached 1 A, meaning that the electrical resistance of coil-less heating element 4 is 3.8Ω. The sintering process is applied in ambient air and may take about 1 minute. The sintering process may be speeded up by adding oxygen air.

III) Coil-Less Atomizer with a Liquid Guiding Structure (FIGS. 3(*a*)-3(*c*))

The coil-less heating element 4 with a desired resistance is prepared as described above. Liquid supply 34 may be assembled to have direct contact with a first pad 13. Alternatively, liquid supply 34 may be in contact with a gasket made of wood fiber, which in turn contacts first pad 13 to conduct liquid onto heating section 6.

Prophetic Example 2. A Coil-Less Atomizer as Shown in FIG. 5, Prepared According to the Process Illustrated in FIGS. 8 and 9

I) Installation and Optional Sputtering (FIG. 8)

In this example, fiber material pad 19 made of carbon is shaped by laser cutting or die punching process to provide a shape having first and second fiber material sections and a third fiber material section between the first and second fiber material sections. The diameter of carbon fiber material pad 19 is about 8 mm. The thickness of carbon fiber material pad 19 is about 1 mm. The third fiber material section has a length of about 3 to about 4 mm, and a width of about 1 mm. The first and second fiber material sections have an area of more than three or five times of the area of the third fiber material section. The shaped carbon fiber material pad 19 is installed on board 1, for example a circular PCB, between two metal leads 3 and 3'. Board 1 has a through hole 1' between leads 3 and 3'. The third fiber material section of the carbon fiber material pad 19 overlaps with through hole 1'. The component obtained may be used as a heating element in a coil-less atomizer in an electronic cigarette.

A second exemplary heating element is further processed to lower the electrical resistance of the two end sections. As shown in FIG. 8, a mask 8 is placed over a portion of the third fiber material section. Through hole 1' overlaps with masked portion 15. Unmasked portions 9 and 9' are sputtered with $Cr^{++}$. Mask 8 is removed to expose the fibers underneath. A first pad 13 and a second pad 13' are applied such that a portion of conductive fibers 2 or the entire section of conductive fibers 2 in heating section 6 are sandwiched between pads 13 and 13' to provide a coil-less heating element 4 as illustrated in FIG. 5.

II) Sintering (FIG. 9)

The electrical resistance of coil-less heating element 4 is about 2.8 to about 3.2Ω. A voltage of 3.8 V is applied to leads 3 and 3', and the current (I) through the coil-less heating element 4 is monitored. The voltage is switched off when the measured current (I) reached 1 A, meaning that the electrical resistance of coil-less heating element 4 is 3.8Ω. The sintering process is applied in ambient air and may take about one minute.

III) Coil-Less Atomizer with a Liquid Guiding Structure (FIGS. 3(*a*)-3(*c*))

The coil-less heating element 4 with a desired resistance is prepared as described above. Liquid supply 34 may be assembled to have direct contact with a first pad 13. Alternatively, liquid supply 34 may be in contact with a gasket made of wood fiber, which in turn contacts first pad 13 to conduct liquid onto heating section 6.

Figure 10:
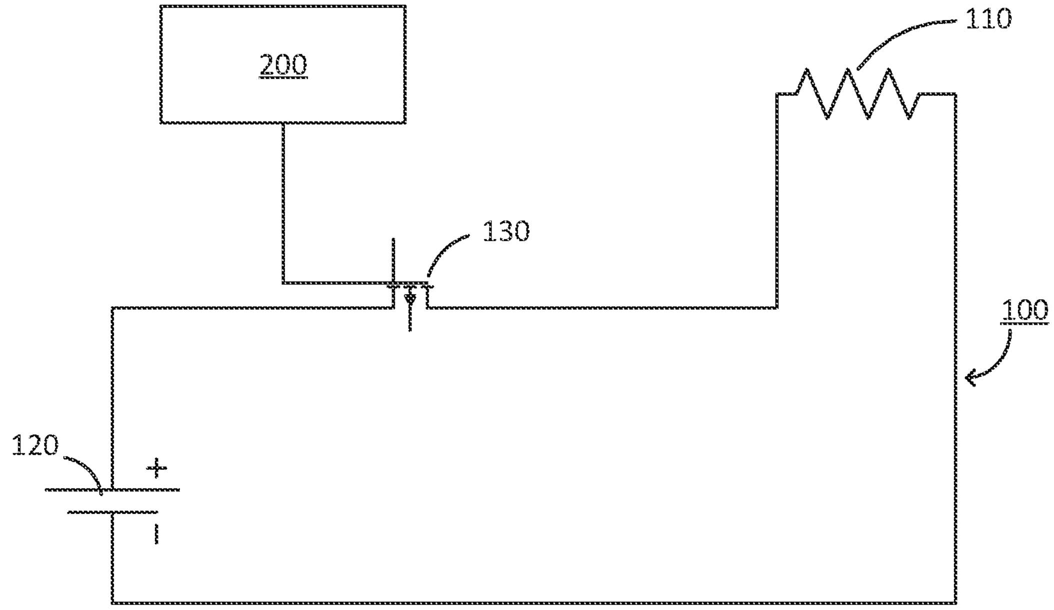
FIG. 10 is a diagram showing a heating circuit of an electronic cigarette including a dynamic output power management unit.

In the embodiment of the application according to FIG. 10, a heating circuit 100 having a heating element 110, a power source 120, and a first switching element 130 connected between heating element 110 and power source 120 is illustrated. Heating element 110 may be fiber based, for example made from conductive fibers such as carbon fibers or a braid made from conductive fibers, such as carbon fibers and non-conductive fibers, such as glass fibers. The fiber based heating element can be treated or remain substantially dry during working so that it has a substantially constant resistance at the working temperature range. The first switching element 130 can be a first MOSFET (Metal Oxide Semiconductor Field Effect Transistor) switch, which is configurable between an ON state and an OFF state by a first control waveform. The power source 120 can be a common battery, for example, a Nickel-Hydrogen rechargeable battery, a Lithium rechargeable battery, a Lithium-manganese disposable battery, or a zinc-manganese disposable battery. The first control waveform can be generated by a waveform generator which can be included in a power management unit (PMU) 200 or can be implemented by a dedicated circuitry or by a processor or a controller implementing functions.

Figure 15:
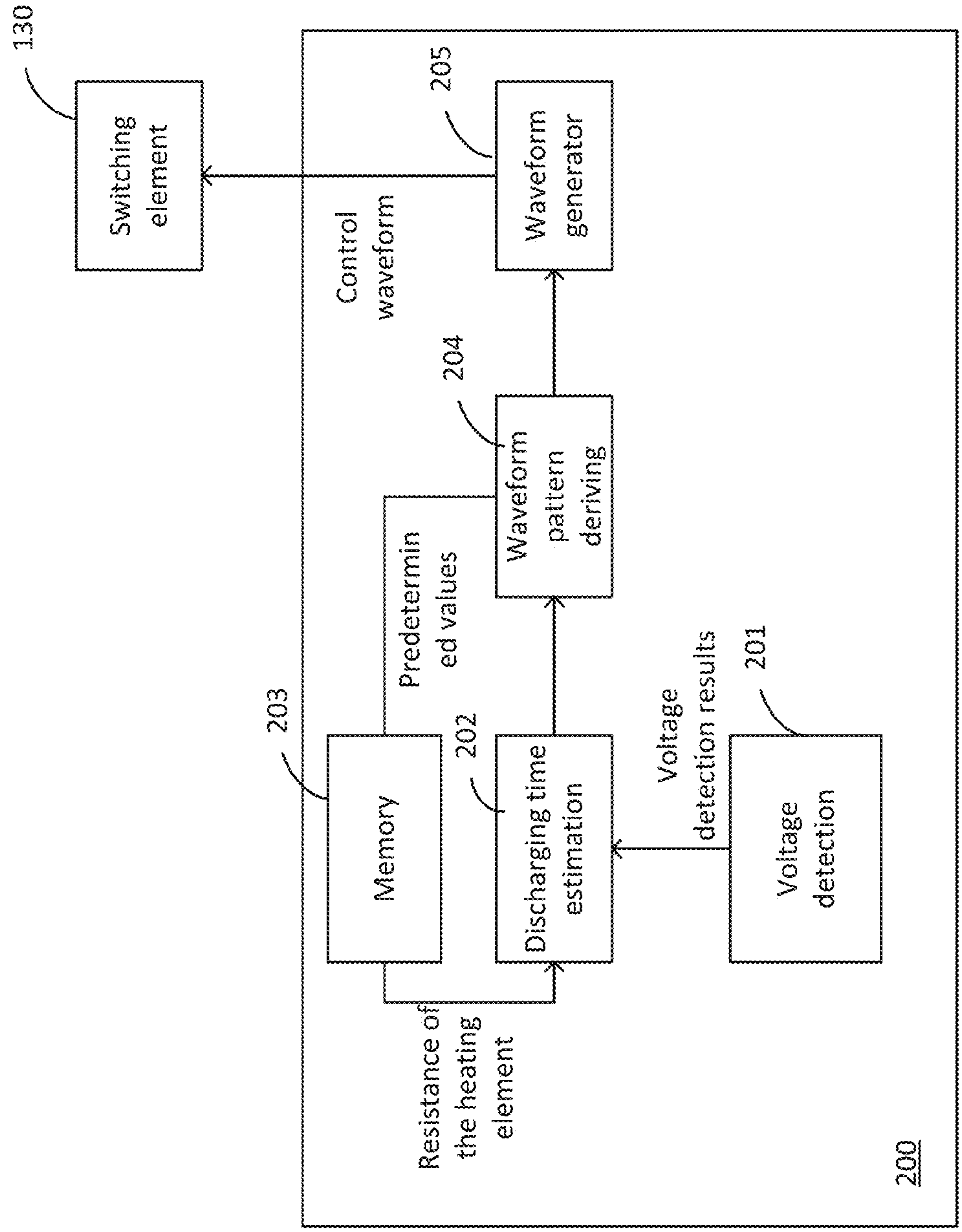
FIG. 15 is a block diagram illustrating the dynamic output power management unit in FIG. 10.

FIG. 15 shows an alternative embodiment where power management unit 200 has at least one voltage detector 201 for detecting output voltage of power source 120. A discharging time estimation device 202 estimates the discharging time of the power source in the duration of a puff based on the output voltage detected and a resistance of the heating element stored in a memory device 203. A waveform pattern deriving device 204 determines the hightime and lowtime ratio of the first control waveform based on the estimated discharging time and a predetermined power consumption P and a time a puff normally lasts tp stored in the memory. A waveform generator 205 generates first control waveform according to the pattern determined.

Figure 17A:
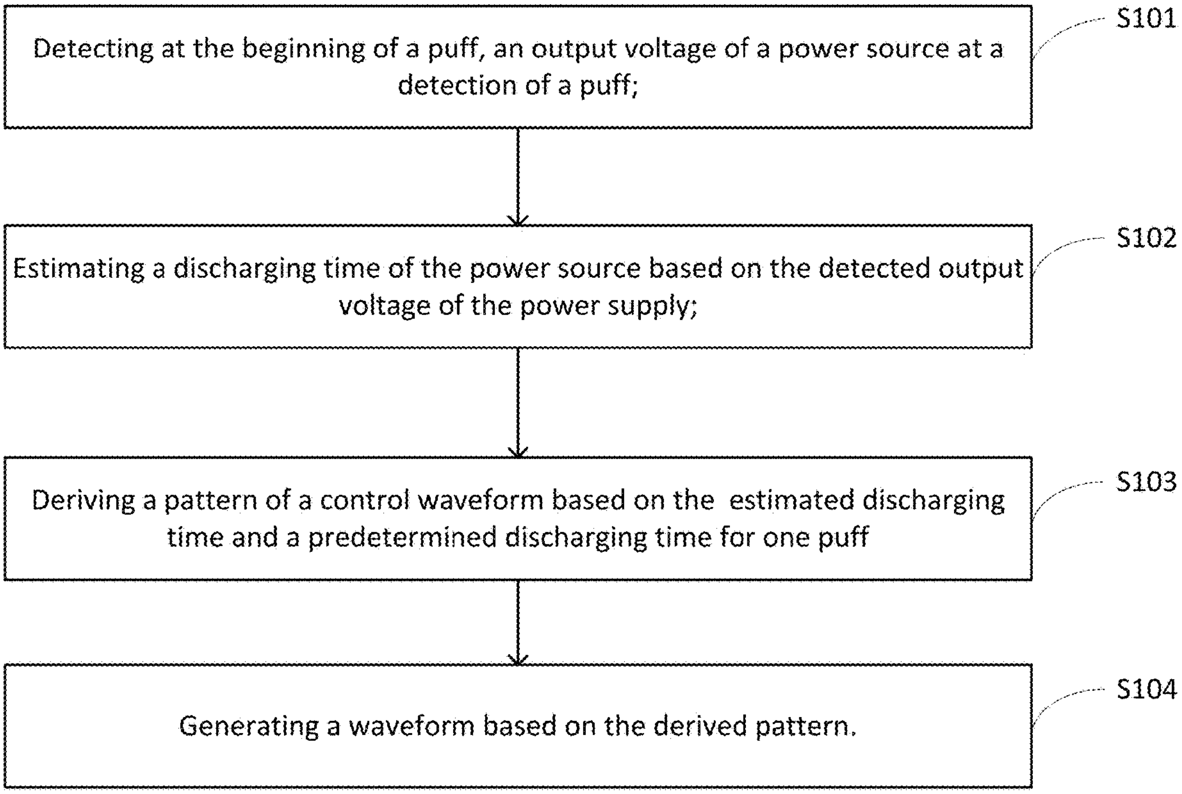
FIG. 17A is a flowchart of a control method by the power management unit illustrated in FIG. 15.

As illustrated in FIG. 17A, at step S101 detection of the working voltage of the power supply can be done at the beginning of each puff to derive the time the heating element should be powered. The predetermined power consumption P and the time a puff normally lasts tp are known parameters and can be stored in advance within memory device 203, for example, registers within a microcontroller.

The energy consumption of the heating element for one puff is estimated based on the resistance of the heating element using Equation 1, which is then used at step S102 for deriving a period of time that needed for providing the heating element with the desired energy:

$$P\times tp/th\text{-}p=V2/Rh \text{ or } th\text{-}p/tp=P\times Rh/V2; \qquad \text{Equation 1:}$$

wherein P is a predetermined power consumption of the heating element for one puff; th-p is the time of the heating element should be powered on; tp is the time a puff normally last; V is the working voltage of the power supply; and Rh is the resistance of the heating element.

With the estimated time that the heating element is to be powered, at step S103 a waveform pattern can be derived.

For example, the derived th-p can be equal to or greater than the duration of a puff tp. In this circumstances, first switching element 130 can be maintained at the OFF state during the entire puff duration. The output of power source 120 that applied onto heating element 110 in this puff then presents in the form of a DC output.

In other examples, the derived th-p can be smaller than the duration of each puff tp. In this case, first switching element 130 can be configured according to different control waveforms of different hightime and lowtime ratios, to reflect the ratio of th-p to tp.

A waveform device, for example waveform generator 205, is then used at step S104 to generate the first control waveform according to the derived waveform pattern.

Figure 17B:
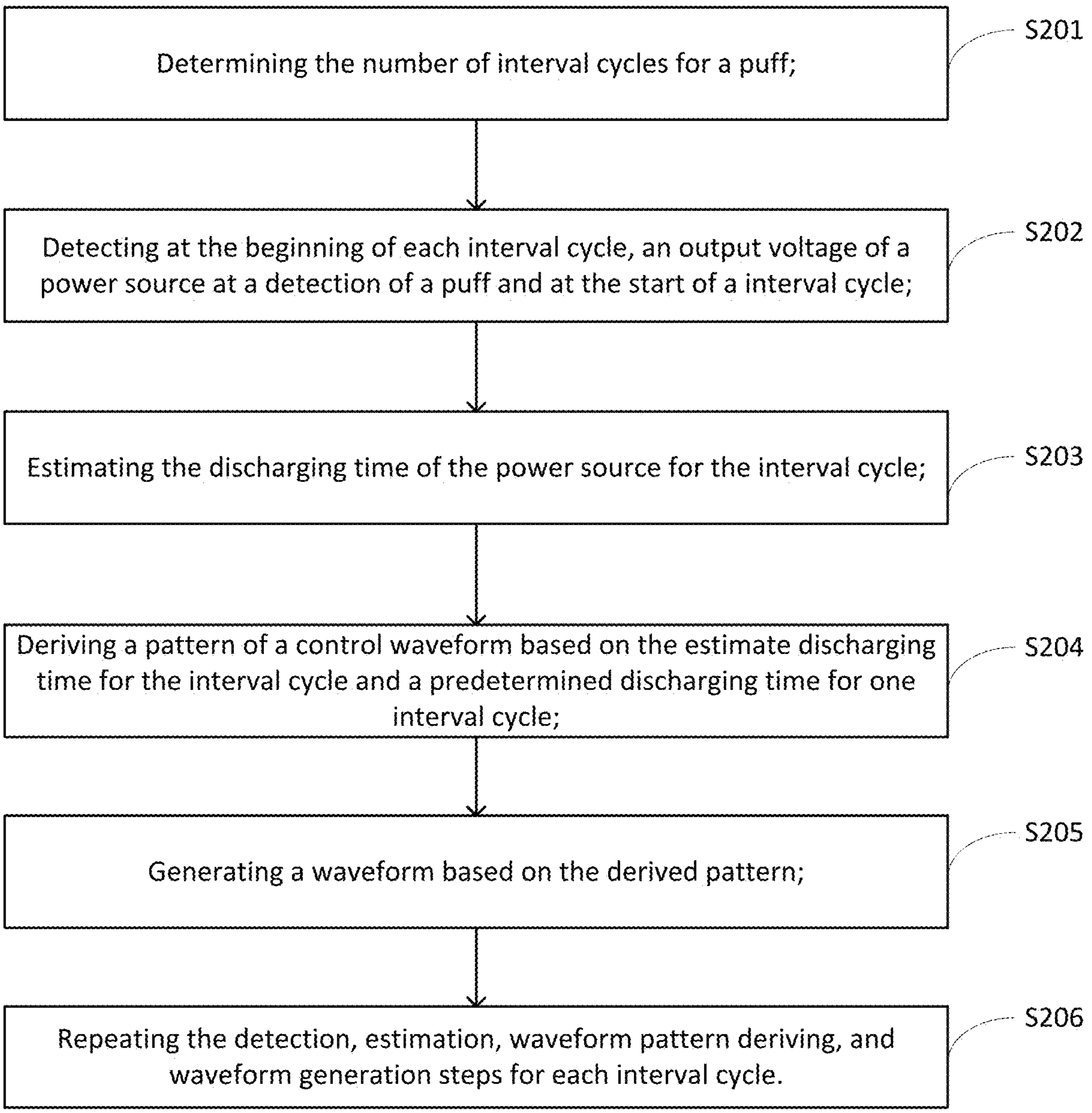
FIG. 17B is a flowchart of a control mechanism implemented by the power management unit illustrated in FIG. 15 according another embodiment of the invention.

In a further embodiment, as illustrated in FIG. 17B, a puff can be divided into multiple interval cycles, for example N interval cycles, each cycle tc will last for a time of tc=tp/N, S201. Working voltage of the power source can be slightly different in the respective interval cycles and discharging time of the power source for each interval cycle can be derived accordingly based on detection of the working voltage at the beginning of each interval cycle S202. Similar algorithm as described above can be applied to each cycle to determine the time the heating element should be powered for the duration of tc. The time of the heating element should be powered for each cycle t'h-p can be derived at step S203 from Equation 2:

$$t'h\text{-}c/tc=P\times Rh/V2; \qquad \text{Equation 2:}$$

wherein P is a predetermined power consumption of the heating element for one interval cycle, and the predetermined power consumption for one interval cycle can be a result of the predetermined power consumption for a cycle divided by the number of interval cycles.

Similarly, with the estimated time that the heating element is to be powered at step S204, a waveform pattern can be derived.

The derived t'h-p can be equal to or greater than the duration of an interval cycle tc. First switching element 130 can thus be maintained at the OFF state during the entire interval cycle. The output of power source 120 applied to heating element 110 in this interval cycle then presents in the form of a DC output.

In other examples, the derived t'h-p can be smaller than the duration of each puff tc, and first switching element 130 can be configured according to different control waveforms of different hightime and lowtime ratios, to reflect the ratio of t'h-p to tc. In accordance with this step, energy converted in a period of time is substantially identical to a predetermined energy conversion value for a same period of time.

A waveform device, for example waveform generator 205, is then used in step S205 to generate the first control waveform according to the derived waveform pattern.

The process is repeated at step S206 until waveforms for all interval cycles of the puff are generated.

Bipolar transistors and diodes can also be used as switching elements for activating or deactivating the heating circuit instead of using MOSFET switches as switching elements.

The first control waveform can be a PWM (Pulse Width Modulation) waveform and the waveform generator can be a PWM waveform generator. The PWM waveform generator can be part of a microprocessor or part of a PWM controller.

Figure 11:
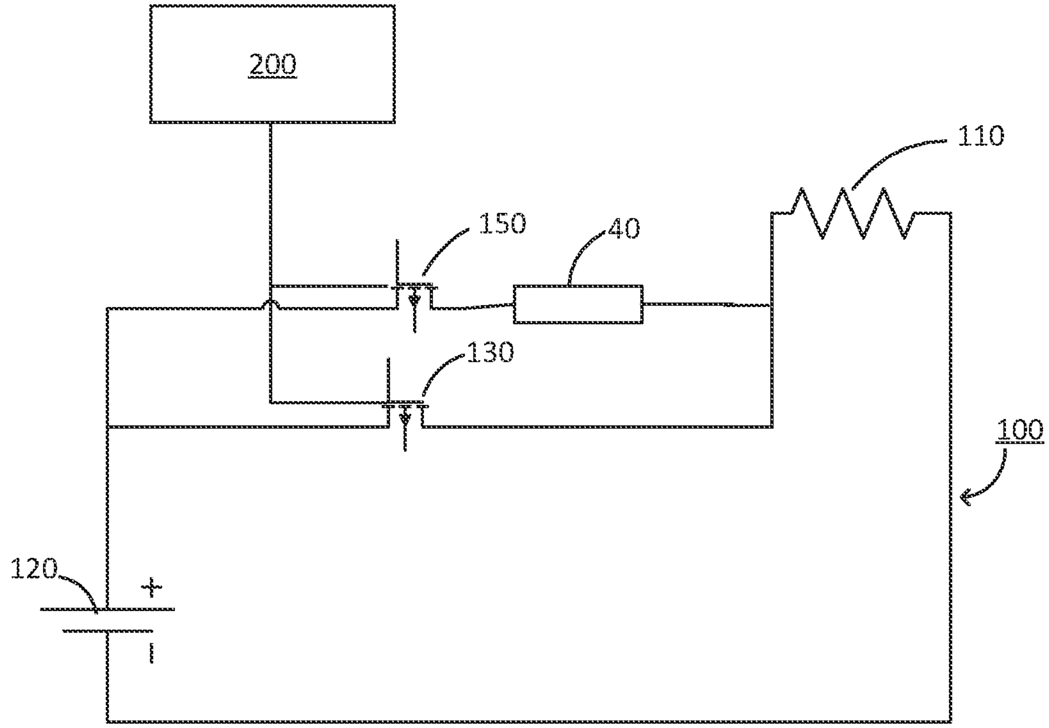
FIG. 11 is a diagram showing another embodiment of a heating circuit of an electronic cigarette including a dynamic output power management unit.

In FIG. 11, in addition to the components described with reference to FIG. 10, heating circuit 100 further comprises a reference element, for example a reference resistor 40 or a set of reference resistors connected in series or in parallel having a substantially constant resistance value, which is connected in series with heating element 110 and disconnected from the heating circuit via a second switching element 150, for example a second MOSFET switch which is configurable between an ON state and an OFF state by a second control waveform. Reference resistor 40 has a known resistance Rf that is consistent over the working temperature and working time of the electronic cigarette.

Figure 16:
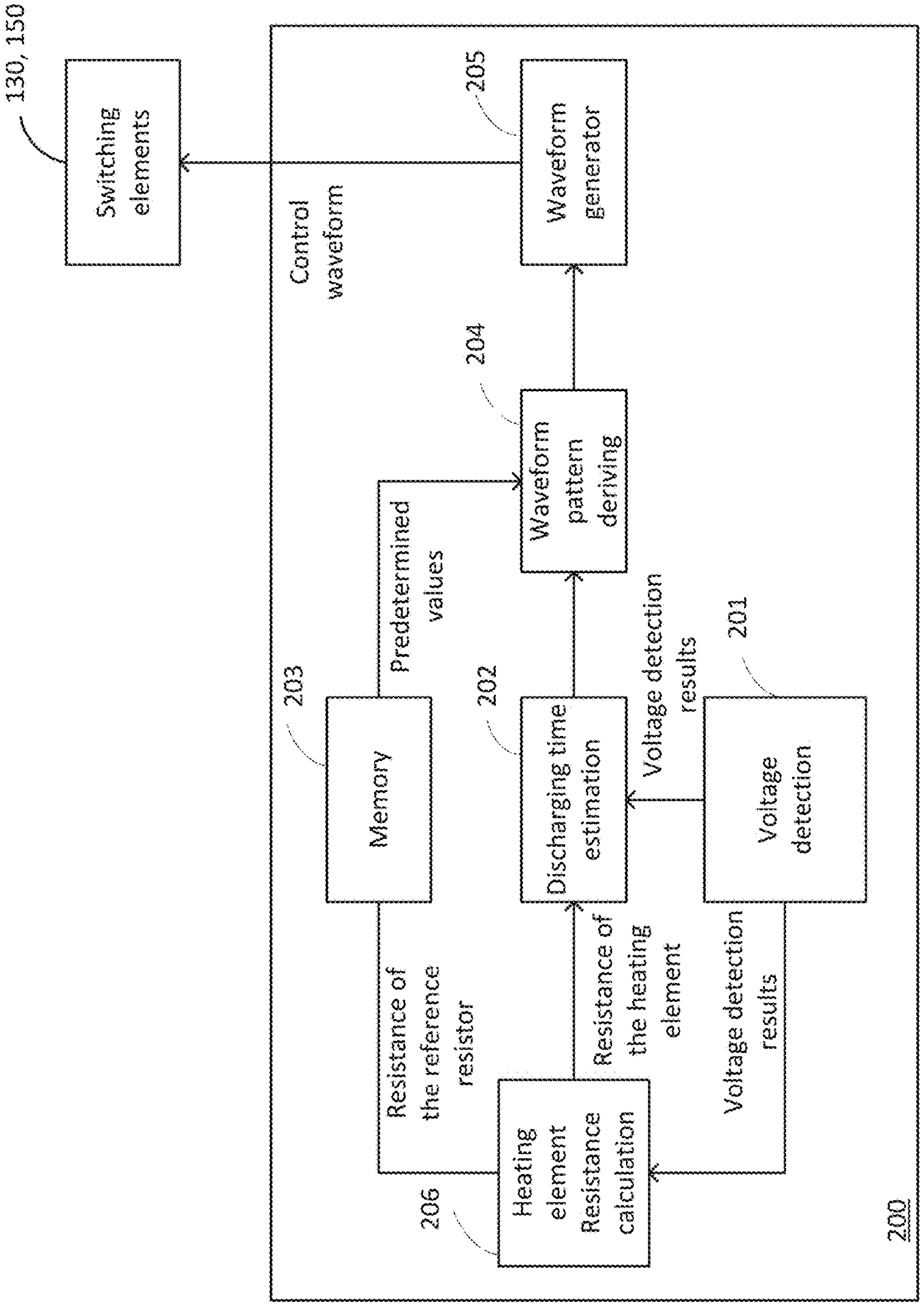
FIG. 16 is a block diagram illustrating the dynamic output power management unit in FIG. 11.

A block diagram of power management unit (PMU) 200 in the exemplary heating circuit in FIG. 11 is illustrated in FIG. 16. Power management unit 200 comprises at least one voltage detector 201 for detecting an output voltage of power source 120 and/or a voltage drop across the reference resistor, and/or a voltage drop across the heating element. A heating element resistance calculation unit 206 calculates the instantaneous resistance or mean value of the resistance of the heating element based on the detected output voltage of the power source and/or the voltage drop across the reference resistor and/or the voltage drop across the heating element, and a resistance value of the reference resistor stored within memory device 203. Discharging time estimation device 202 estimates the discharging time of the power source in the duration of a puff based on the output voltage detected and the calculated resistance of the heating element. Waveform pattern deriving device 204 determines the hightime and lowtime ratio of the first control waveform based on the estimated discharging time and a predetermined power consumption P and a time a puff normally lasts tp stored in memory device 203. Waveform generator 205 generates the first control waveform according to the pattern determined.

Figure 18A:
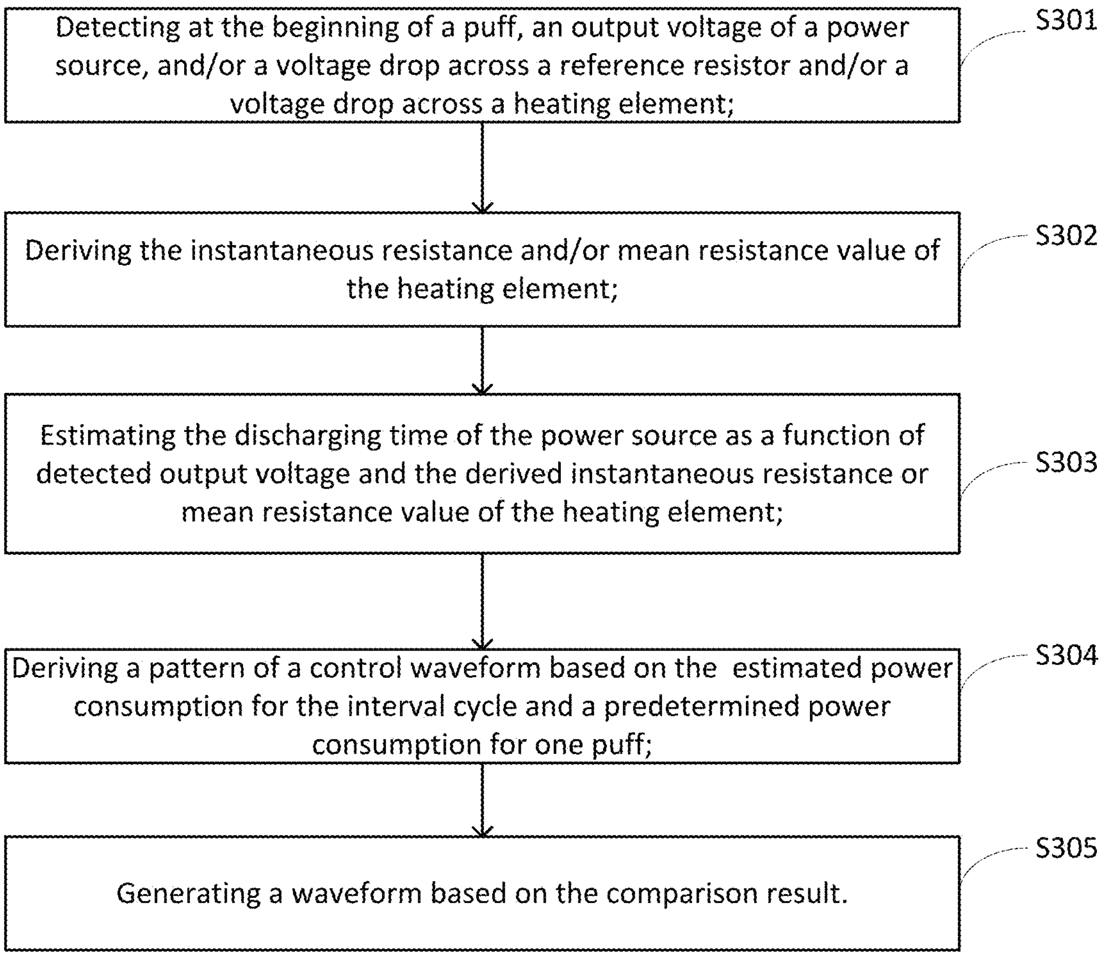
FIG. 18A is a flowchart of an alternative control method by the power management unit illustrated in FIG. 16.

To detect an output voltage of a power source, and/or a voltage drop across a reference resistor and/or a voltage drop across heating element 110, first switching element 130 is configured to the ON state and second switching element 150 is configured to the OFF state. Power source 120, reference resistor 40 and heating element 110 are connected as a closed circuit. As illustrated in FIG. 18A, at step S301 detection of the working voltage of power source 120 and/or the voltage drop across heating element 110 are performed. The instantaneous resistance can then be derived at step S302 by calculating with reference to the resistance of reference resistor 40 and the voltages measured using Equation 3.

$$Rh=V2\times Rf/(V1-V2); \qquad \text{Equation 3:}$$

wherein Rh is the instantaneous resistance of the heating element; Rf is the resistance of the reference resistor; V1 is the working voltage of the DC power source; and V2 is the voltage drop across the heating element.

Alternatively or in addition, at step S302 the voltage drop across reference resistor 40 can be detected for deriving the instantaneous resistance of heating element 110. Equation 3 can in turn be slightly adjusted to involve the voltage drop of reference resistor 40 instead of the output voltage of power source 120.

The measurement and calculation of the instantaneous resistance of the heating element can be repeated, and a mean value of can be derived from the result of the repeated calculation results and can be used for further processing.

After the instantaneous resistance or the mean resistance of the heating element is calculated. An output voltage of power source 120 is detected again with the first switching element in the OFF state and the second switching element in the ON state. A discharging time of the power source for one puff is then estimated at step S303 based on the calculated resistance of the heating element and the newly detected output voltage of the power source using Equation 1. After the discharging time is estimated, at step S304 a waveform pattern can be determined and control waveforms can be generated at step S305.

Figure 18B:
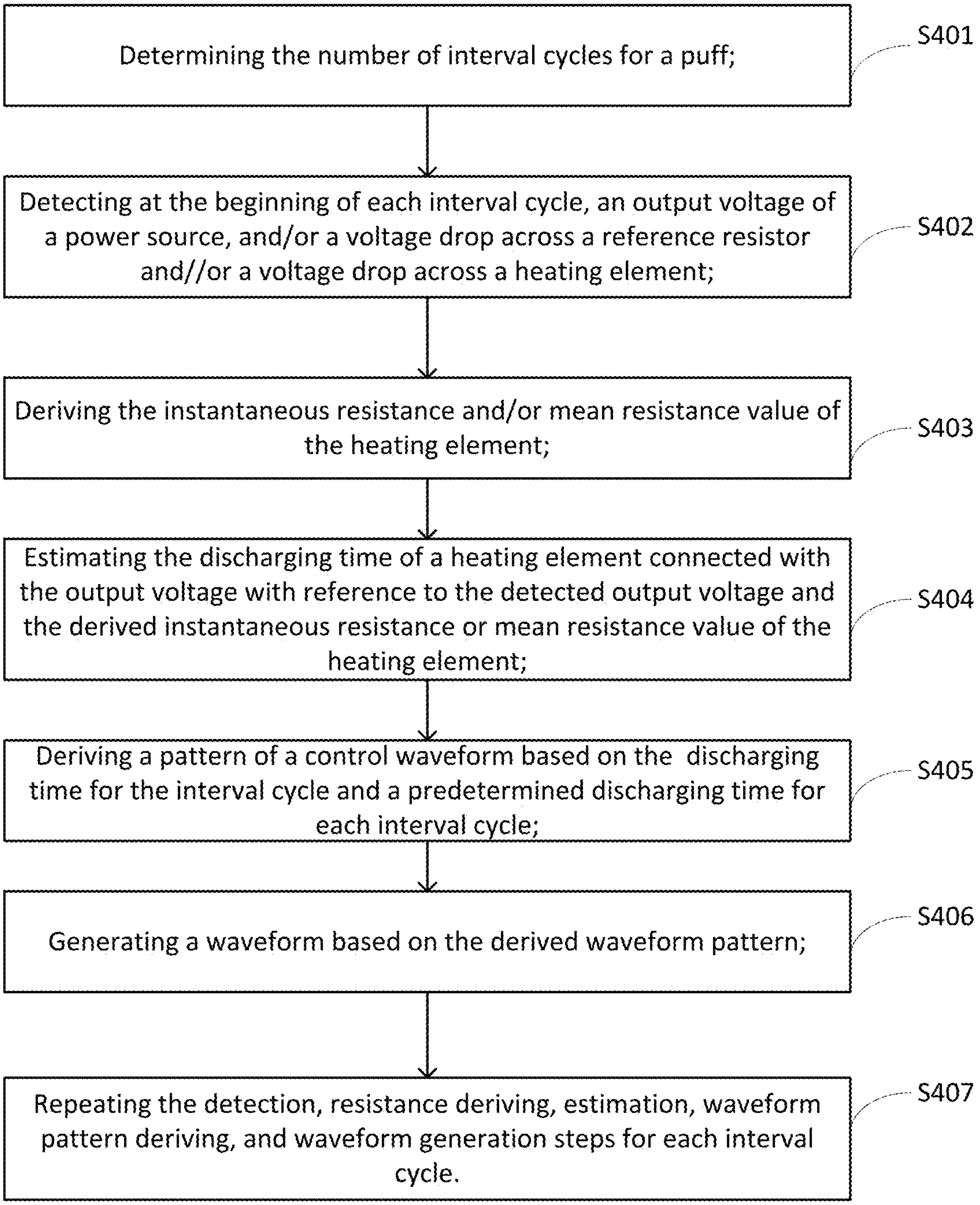
FIG. 18B is a flowchart of an alternative control method by the power management unit illustrated in FIG. 16.

Likewise, in this embodiment, as illustrated in FIG. 18B, a puff can also be divided into multiple interval cycles, for example N interval cycles, each cycle tc lasting for a time of tc=tp/N, S401. Equation 2 can again be used to derive the time of the heating element that should be powered for each cycle.

At a beginning of a first time interval, first switching element 130 is ON and second switching element 150 is OFF. Voltage drop across reference resistor 40 and the output voltage of the power source are then detected at step S402. The instantaneous resistance of heating element 110 can then be derived from Equation 3 at step S403.

After the instantaneous resistance of the heating element is derived, the first switching element 130 is configured to the OFF state and second switching element 150 is configured to the ON state whereby reference resistor 40 is disconnected from heating circuit 100. The output voltage V of power source 120 is then detected again and the discharging time of power source 120, that is, the time that first switching element 130 needs to be maintained at the OFF state in the interval cycle for a desired energy conversion at the heating element, is derived according to Equation 2 at step S404.

The time that first switching element 130 should be maintained at the OFF state is then derived for each interval cycle following the same process as mentioned above. In some embodiments, the instantaneous resistance of the heating element is derived at the beginning of each puff and is only derived once and is then used for deriving the time that first switching element 130 should be maintained at the OFF state for the duration of the puff. In other embodiments, the instantaneous resistance of heating element 110 is derived at the beginning of each interval cycle and is used only for deriving the time that first switching element 130 needs to be maintained at the OFF state for that interval cycle. Deriving the instantaneous resistance of the heating element may be desirable if the heating element is very sensitive to its working temperature.

Similarly, a mean value of the resistance for the reference resistor can be derived instead and used for deriving the time that the first switching element needs to be configured at the OFF state.

In some embodiments, the derived t'h-p can be equal to or greater than the duration of each interval cycle tc, under such circumstances, first switching element 130 will be maintained at the OFF state during the entire interval cycle and based on the ratio of t'h-p to tc, first switching element 130 may also be maintained at the OFF state for a certain period of time in a subsequent interval cycle or the entire duration of the subsequent interval cycle. The output of power source 120 supplied to heating element 110 in this interval cycle or interval cycles is a DC output.

In other embodiments, the derived t'h-p can be smaller than the duration of each interval cycle tc. In these circumstances, first switching element 130 is configured according to different control waveforms, for example PWM waveforms of different high time and low time ratios, to reflect the ratio of t'h-p to tc.

For example, at step S405 a waveform pattern is then determined according to the ratio of t'h-p to tc and the first and the second control waveforms are generated according to the determined waveform pattern at step S406. Control waveforms for all interval cycles are generated by repeating the above steps at step S407.

Similar to the first control waveform, the second control waveform can also be a PWM waveform and the waveform generator can be a PWM waveform generator. The PWM waveform generator can also be part of a microprocessor or part of a PWM controller.

Alternatively or in addition to the embodiment described in FIG. 11, reference resistor 40 can be arranged in parallel with heating element 110. In this arrangement, the instantaneous resistance of heating element 110 can be derived with reference to the current flow across each branch of the heating circuit.

In some embodiments, the voltage across reference resistor 40 and heating element 110 can be detected by a voltage probe, a voltage measurement circuit, or a voltage measurement device.

Calculations according to Equations 1 to 3 can be performed by a processor or a controller executing instruction codes or by dedicated calculation circuits designed to perform the above mentioned logics.

In an embodiment of the invention, a microprocessor having a PWM function and a storage function is used. The storage function can store the instructions code that when executed by the microprocessor can implement the logic as described above.

In a further embodiment, instead of deriving the discharging time to generate the control waveforms, an estimated power consumption of the heating element can be derived for generating the control waveforms.

Figure 19:
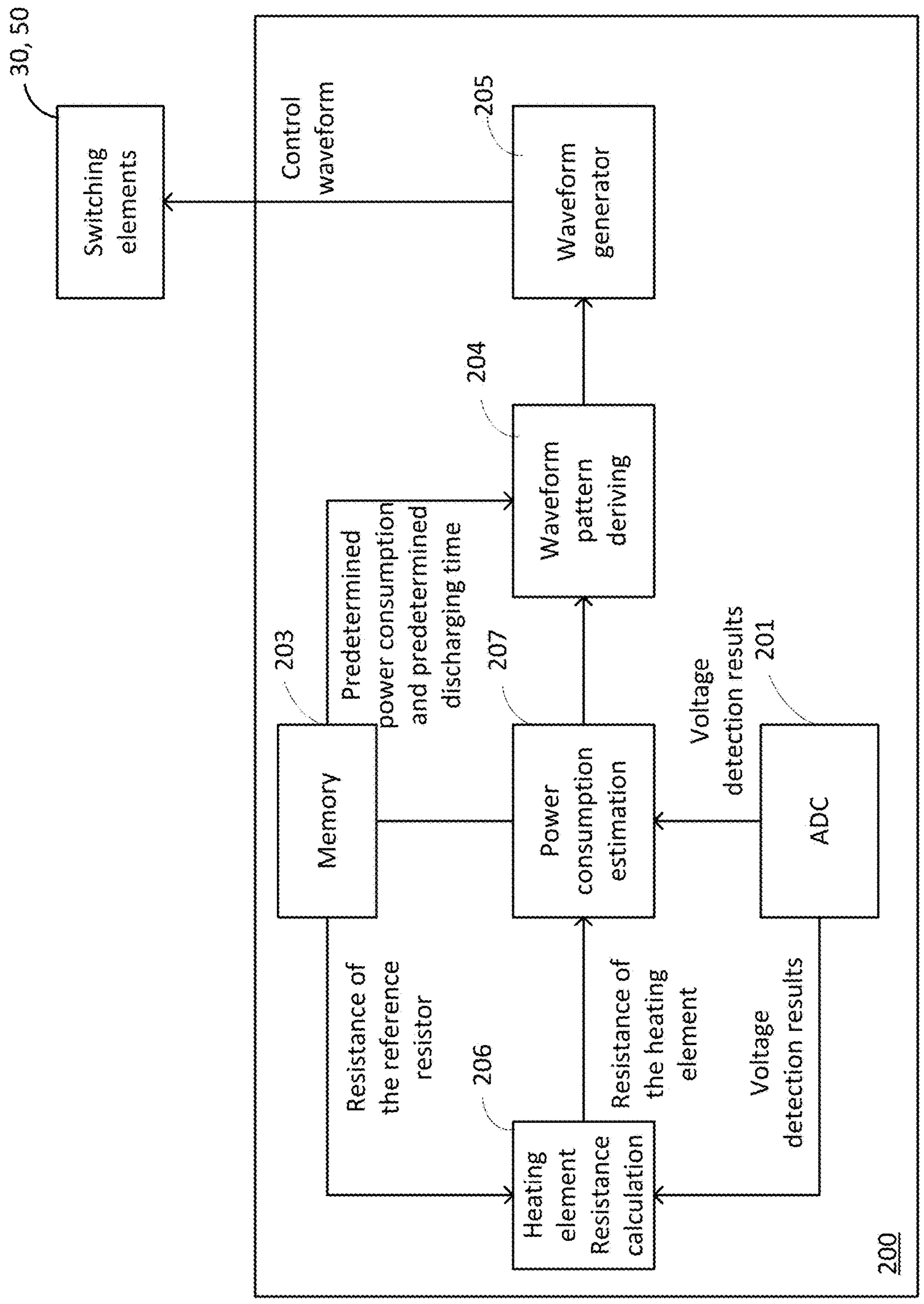
FIG. 19 is a block diagram illustrating another example of the dynamic output power management unit in FIG. 11.

As illustrated in FIG. 19, the power management unit in this example includes a voltage detector 201 (ADC) for detecting a first output voltage of power source 120 and/or a voltage drop across reference resistor 40, and/or a voltage drop across heating element 110. Heating element resistance calculation unit 206 calculates the instantaneous resistance or mean value of the resistance of the heating element based on the detected first output voltage of the power source and/or the voltage drop across the reference resistor and/or the voltage drop across the heating element. A resistance value of reference resistor 40 stored within memory device 203. A power consumption estimation device 207 estimates the power consumption during a given period of time, for example the duration of a puff or an interval cycle within the puff, based on a second output voltage detected and the calculated resistance of the heating element. Waveform pattern deriving device 204 determines the hightime and lowtime ratio of the first control waveform based on the estimated power consumption and a predetermined power consumption P stored in memory device 203. Waveform generator 205 generates a first control waveform according to the pattern determined.

The heating element in this example may be a carbon fiber based heating element. An ADC of a microcontroller reads the voltage ratio of the carbon fiber heating element V_wick and the voltage drop V_res across a reference resistor having a resistance of R_standard. The resistance of the standard resistor is known, and the resistance of the carbon fiber heating element can be derived by Equation 4:

$$R\_wick=(V\_wick-V\_res)/R\_standard \quad \text{Equation 4:}$$

The reference resistor is then disconnected from the heating circuit and the carbon fiber heating element. The ADC then reads the closed circuit voltage of the carbon fiber V_close. The power of the carbon fiber can be calculated by Equation 5:

$$P\_CF=V\_close\hat{}2/R\_wick \quad \text{Equation 5:}$$

The estimated power P_CF can be for example 3.2 W which is higher than a predetermined value of 2.5 W, the ON and OFF time of first switching element 130 can then be determined by determining the hightime and lowtime ratio of the control waveform.

For example, in every 50 ms long cycles, the hightime is 50 ms*hightime/lowtime=50 ms*0.78=39 ms, the lowtime is 50 ms-hightime=11 ms.

A control waveform is then generated by the waveform generator to configure the ON/OFF time of first switching element 130.

In case the estimated P_CF is smaller than the predetermined value of 2.5 W, the output waveform to first switching element will be all OFF, and the output of the power source will be provided as DC.

Figure 12:
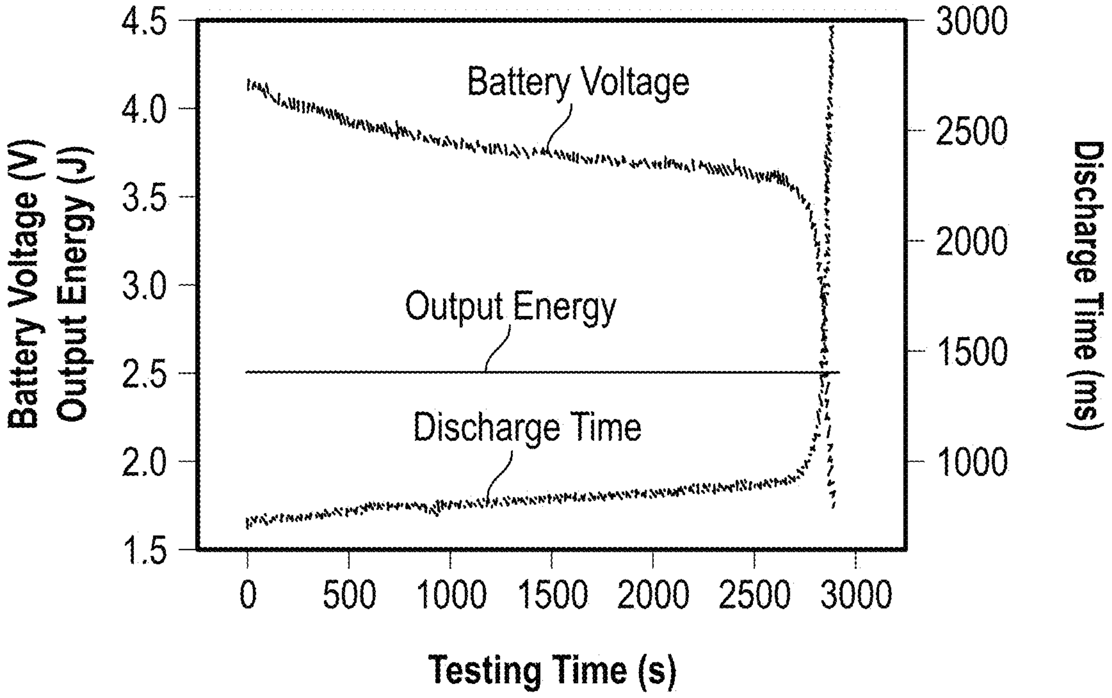
FIG. 12 is a diagram showing the discharging time of a power supply when the heating element has a constant resistance.
Figure 13:
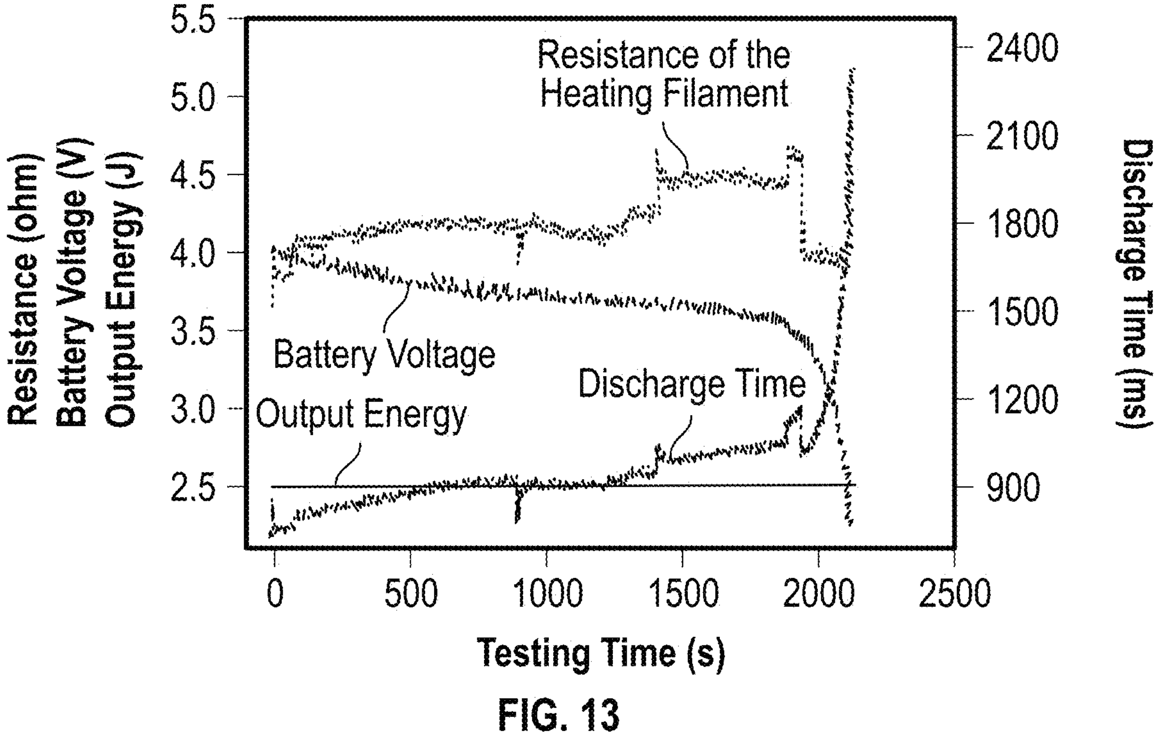
FIG. 13 is a diagram showing the discharging time of a power supply when the heating element has a variable resistance.
Figure 14:
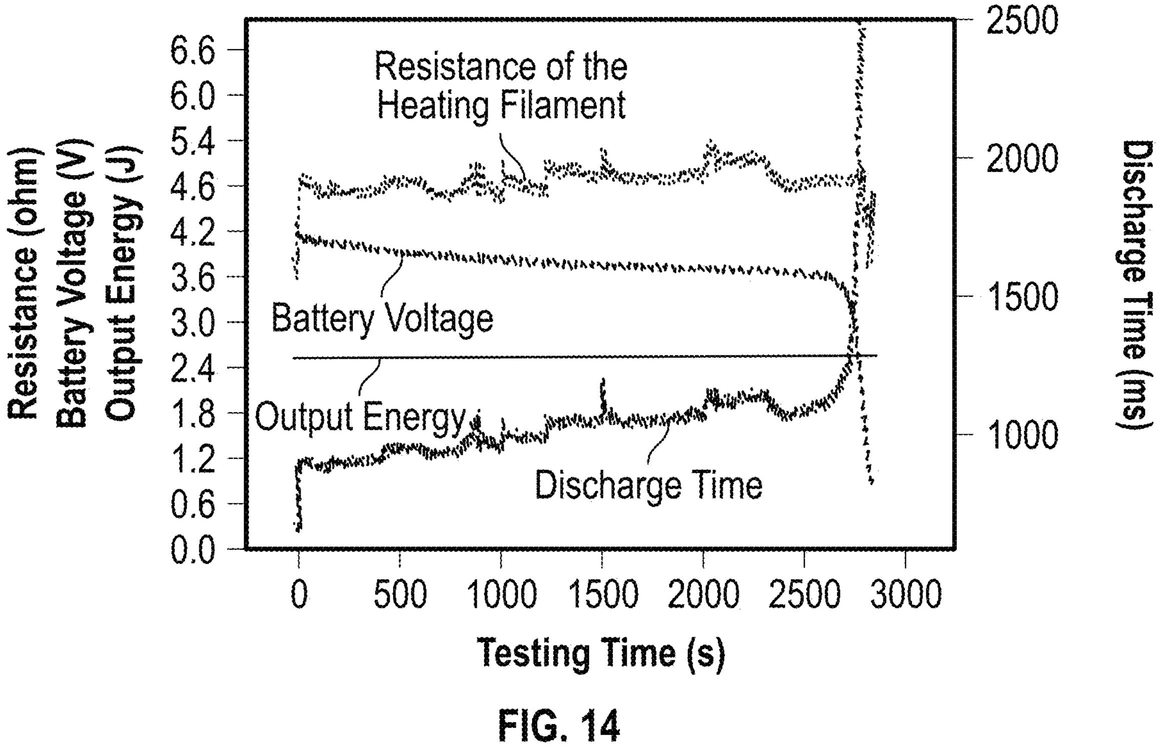
FIG. 14 is a diagram showing the discharging time of another power supply when the heating element has a variable resistance.

FIGS. 12 to 14 are diagrams showing testing results of the heating circuit using the power management unit. These results show substantially constant output have been maintained even though the resistance of the heating element may vary during the working cycle of the heating element and/or the battery voltage may drop with the lapse of time.

Testing Result 1: Substantially Constant Resistance of the Heating Element with Decreasing Battery Capacity In one example, dynamic discharging tests using the dynamic output power management unit of FIG. 10 were carried out on a dry heating element, i.e., a heating element having substantially consistent resistance. The results are shown in FIG. 12, wherein the data lines from the top to the bottom represent the battery voltage V, the output energy in J at 280 mAh, and the discharge time in ms, i.e. the powered time, over testing time in seconds.

In some examples, the resistance of the heating element changes depending on the working condition of the heating element, e.g. amount of e-solution the heating element contacts, carbonization around/in the heating element, and the working temperature. The heating element may be a conventional heating element or a fiber based heating element, for example a carbon fiber heating element as disclosed in co-pending international application No. PCT/CN2014/076018, filed on Apr. 23, 2014 and titled "Electronic cigarette with Coil-less atomizer application", the entire content of which is incorporated herein by reference.

Example 2: Wetted Heating Element with Decreasing Battery Capacity

In another example, wet dynamic discharging tests using the dynamic output power management unit of FIG. 10 or 11 were carried out on a wetted heating element, i.e., the resistance of the heating element may change when it has different amount of liquid. The results are shown in FIG. 13. The data lines from the top to the bottom represent the resistance of the heating element in ohms, the battery voltage V, the output energy in J, at 240 mAh, and the discharge time in ms, i.e. the powered time, over testing time in seconds.

Example 3: Wetted Heating Element with Decreasing Battery Capacity

The results for another set of wet dynamic discharging tests are shown in FIG. 14. The data lines from the top to the bottom represent the resistance of the heating element in ohms, the battery voltage V, the output energy in J at 280 mAh, and the discharge time in ms, i.e. the powered time, over testing time in seconds.

The power management system described may include dynamic output power management unit for a heating circuit of an electronic smoking device, with the PMU having at least one voltage detection device to detect an output voltage of a power source, and/or a voltage drop across a heating element operable to be connected to or disconnected from the power source via a first switching element, and/or a voltage drop across a reference element operable to be connected to or disconnected from the heating circuit via a change of state of a second switching element from a first state to a second state and from a second state to the first state. A controller is configured to change the second switching element from the first state to the second state; to receive a first detection result from the detection device; derive a resistance of the heating element; change the second switching element from the second state to the first state; receive a second detection result from the voltage detection device; and derive a discharging time of the power source as a function of the resistance of the heating element and the second voltage detection. As a result, energy converted in a period of time is substantially identical to a predetermined energy conversion value for a same period of time.

Figure 20:
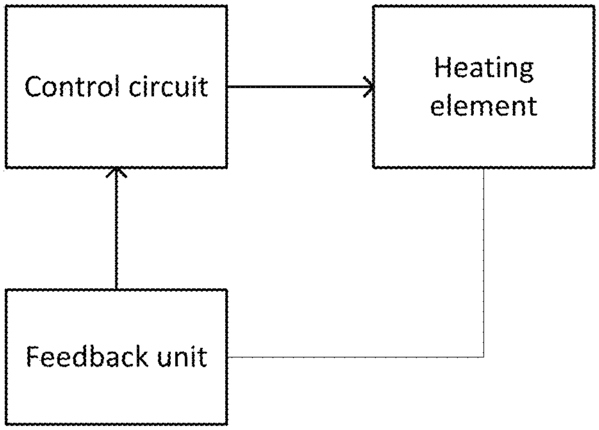
FIG. 20 is a block diagram illustrating a control circuit to the heating element based on analog electronics.

The power management system described may operate on instructions stored on non-transitory machine-readable media, the instructions when executed causing a processor to control a voltage detection device to detect a first output voltage of a power source, and/or a voltage drop across a heating element operably connected to the power source via a first switching element, and/or a voltage drop across a reference element operably connected to the power source via a second switching element. The first output voltage is detected when the reference element is connected to the power source. The instructions may direct the processor to derive a resistance of the heating element as a function of the at least two of the first output voltage of a power source, the voltage drop across the heating element and the voltage drop across the heating element, and to control the voltage detection device to detect a second output voltage of the power source. The processor may then estimate the discharging time of the power source for the puff as a function of the second output voltage of the power source and the derived resistance of the heating element such that an energy converted in the puff is substantially identical to a predetermined energy conversion value for one puff. Alternatively, the heating element can be controlled by analog electronics. The analog electronics described herein may comprises, according to FIG. 20 a control circuit receiving feedback signal from a feedback unit. The feedback unit is designed to measure the electrical status of the heating element and generate a feedback signal to the control circuit. Upon receiving the feedback signal, the control adjusts the output voltage or output current to the heating element by, for example change a gate voltage of an amplifier connected upstream to the heating element.

As used herein, "about" when used in front of a number means±10% of that number. Reference to fibers includes fiber material (woven or non-woven). Reference to liquid here means liquids used in electronic cigarettes, generally a solution of propylene glycol, vegetable glycerin, and/or polyethylene glycol 400 mixed with concentrated flavors and/or nicotine, and equivalents. References here to fiber materials and capillary action include porous materials, where liquid moves internally through a solid porous matrix. Each of the elements in any of the embodiments described may of course also be used in combination with any other embodiment. Reference to electronic cigarette includes electronic cigars and pipes, as well as components of them, such as cartomizers.

The examples and embodiments described herein are intended to illustrate various embodiments of the invention. As such, the specific embodiments discussed are not to be construed as limitations on the scope of the invention. It will be apparent to one skilled in the art that various equivalents, changes, and modifications may be made without departing from the scope of invention, and it is understood that such equivalent embodiments are to be included herein.

The invention claimed is:

1. An electronic smoking device comprising:

a battery portion attached to an atomizer/liquid reservoir portion;

the battery portion containing a battery electrically connected to control electronics and an airflow sensor;

the atomizer/liquid reservoir portion including an atomizer and an inhalation port;

the atomizer/liquid reservoir portion including a liquid reservoir containing a liquid;

the atomizer comprising a coil-less heating element;

electrical leads electrically connected to opposite ends of the coil-less heating element, the electrical leads electrically connectable to the battery when the atomizer is switched on; and a gasket in the atomizer/liquid reservoir portion in between the liquid reservoir and the coil-less heating element.

2. The electronic smoking device of claim 1 wherein the coil-less heating element comprises a ceramic heater.

3. The electronic smoking device of claim 2 wherein a first side of the gasket contacts the liquid reservoir and a second side of the gasket contacts the ceramic heater, to conduct the liquid from the liquid reservoir to the ceramic heater.

4. The electronic smoking device of claim 3 wherein the gasket comprises wood, cellulose, or plant fibers.

5. The electronic smoking device of claim 3 wherein the ceramic heater has a resistance of about 1-5Ω, and the battery has a voltage of 3-5 volts.

6. The electronic smoking device of claim 3 wherein the battery portion further comprises an LED electrically connected to the control electronics.

7. The electronic smoking device of claim 3 wherein the battery portion further comprises a hollow tube housing and the battery, the control electronics and the airflow sensor are inside of the hollow tube housing.

8. The electronic smoking device of claim 3 further including a central passage extending inside of the atomizer/liquid reservoir portion from the inhalation port towards the ceramic heater.

9. The electronic smoking device of claim 1 further including at least one air inlet leading into the atomizer/liquid reservoir portion.

10. An electronic smoking device comprising:

an atomizer/liquid reservoir including an atomizer and an inhalation port;

the atomizer/liquid reservoir including a liquid reservoir containing a liquid;

the atomizer comprising a coil-less heating element having at least one conductive element extending perpendicular to a longitudinal axis of the electronic smoking device;

electrical leads electrically connected to the coil-less heating element; and a gasket in the atomizer/liquid reservoir in between the liquid reservoir and the coil-less heating element, a first side of the gasket contacting the liquid reservoir and a second side of the gasket contacting the coil-less heating element.

11. The electronic smoking device of claim 10 wherein the gasket comprises wood, cellulose, or plant fibers.

12. The electronic smoking device of claim 10 further including at least one air inlet leading into the atomizer/liquid reservoir.

13. The electronic smoking device of claim 10 further including a central passage extending inside of the atomizer/liquid reservoir from the inhalation port towards the coil-less heating element.

14. The electronic smoking device of claim 10 wherein the coil-less heating element comprises a ceramic heater.

15. The electronic smoking device of claim 10 wherein the gasket conducts the liquid from the liquid reservoir to the coil-less heating element.

* * * * *